United States Patent
Hayashi et al.

(10) Patent No.: US 7,436,408 B2
(45) Date of Patent: Oct. 14, 2008

(54) COMPUTER PROGRAM FOR GENERATING PICTURES

(75) Inventors: Kazuhiko Hayashi, Gunma-ken (JP); Shigenori Abe, Takasaki (JP)

(73) Assignee: Victor Company of Japan, Ltd., Yokohama (JP)

( * ) Notice: Subject to any disclaimer, the term of this patent is extended or adjusted under 35 U.S.C. 154(b) by 981 days.

(21) Appl. No.: 10/804,014

(22) Filed: Mar. 19, 2004

(65) Prior Publication Data
US 2004/0189646 A1    Sep. 30, 2004

(30) Foreign Application Priority Data
Mar. 27, 2003    (JP)    ............................. 2003-087780

(51) Int. Cl.
| | |
|---|---|
| G06T 13/00 | (2006.01) |
| G09G 5/00 | (2006.01) |
| G06F 15/167 | (2006.01) |
| G06K 9/34 | (2006.01) |
| G06K 9/20 | (2006.01) |
| G06K 9/60 | (2006.01) |
| H04N 1/46 | (2006.01) |
| H04N 1/387 | (2006.01) |

(52) U.S. Cl. .................. 345/473; 345/619; 345/541; 382/173; 382/282; 382/305; 386/175; 358/538; 358/543; 707/1

(58) Field of Classification Search ......... 345/473–475, 345/418, 619–621, 629–630, 541–547; 382/100, 382/171, 173, 282, 276–277, 284, 295, 305; 707/100–103 R, 104.1, 200; 700/94; 715/723, 715/728; 386/75, 96, 104, 35
See application file for complete search history.

(56) References Cited

U.S. PATENT DOCUMENTS

| | | | |
|---|---|---|---|
| 4,777,537 A * | 10/1988 | Ueno et al. ................. | 386/101 |
| 5,353,391 A | 10/1994 | Cohen et al. | |
| 5,623,587 A | 4/1997 | Bulman | |
| 6,559,845 B1 | 5/2003 | Harvill et al. | |
| 2004/0122539 A1* | 6/2004 | Ainsworth ................... | 700/94 |
| 2005/0062888 A1* | 3/2005 | Wood et al. ................. | 348/553 |
| 2005/0071744 A1* | 3/2005 | Dunbar et al. ........... | 715/500.1 |

FOREIGN PATENT DOCUMENTS

EP    1059614    12/2000

(Continued)

OTHER PUBLICATIONS

D.N. Wood et al., "Multiperspective Panoramas for Cel Animation", Computer Graphics-Annual Conference Series, vol. 31, 1997, pp. 243-250.

Primary Examiner—Wesner Sajous
(74) Attorney, Agent, or Firm—Louis Woo

(57) ABSTRACT

First and second areas are designated in a source picture. A start picture is generated from a portion of the source picture which extends in the first area. An end picture is generated from a portion of the source picture which extends in the second area. At least one third area is designated in the source picture. The third area extends between the first and second areas. An intermediate picture is generated from a portion of the source picture which extends in the third area. An image file of a prescribed format is generated which contains data representative of animation pictures including the start picture, the intermediate picture, and the end picture. The image file is related with an audio file containing data representative of audio information. A file group including the image file and the audio file is generated. The file group is recorded on a recording medium.

8 Claims, 13 Drawing Sheets

FOREIGN PATENT DOCUMENTS

| | | |
|---|---|---|
| JP | 62-177581 | 8/1987 |
| JP | 11-311522 | 11/1999 |
| JP | 2003-077002 | 3/2003 |
| WO | 00/08853 | 2/2000 |

* cited by examiner

FIG. 13

AUDIO FILE abcdf.mp3

IMAGE FILE aaa-xxx.jmm

FIG. 14

AUDIO FILE abcdf.mp3

AUDIO FILE xyz-123.mp3

AUDIO FILE opqrst.mp3

IMAGE FILE aaa-xxx.jmm

FIG. 15

| HEADER INFORMATION | PICTURE APS | PICTURE AP1 | PICTURE AP2 | PICTURE AP3 | ... | PICTURE APE |

FIG. 16

AUDIO FILE musicxyz.mp3
PICTURE ACCESS FILE musicxyz.jik
IMAGE-FILE FOLDER musicxyz > IMAGE FILE musicxyz01.jma
> IMAGE FILE musicxyz02.jma
> IMAGE FILE musicxyz03.jma
> IMAGE FILE musicxyz04.jma
> IMAGE FILE musicxyz05.jma

FIG. 17

AUDIO FILE abcde.mp3
IMAGE FILE abcde.jmm

FIG. 18

AUDIO FILE abcdf.mp3
AUDIO FILE xyz-123.mp3
AUDIO FILE opqrst.mp3

IMAGE FILE aaa-xxx.jmm
IMAGE FILE bbb-yyy.jmm
IMAGE FILE ccc-zzz.jmm

RELATION INDICATOR FILE audioanim.jix

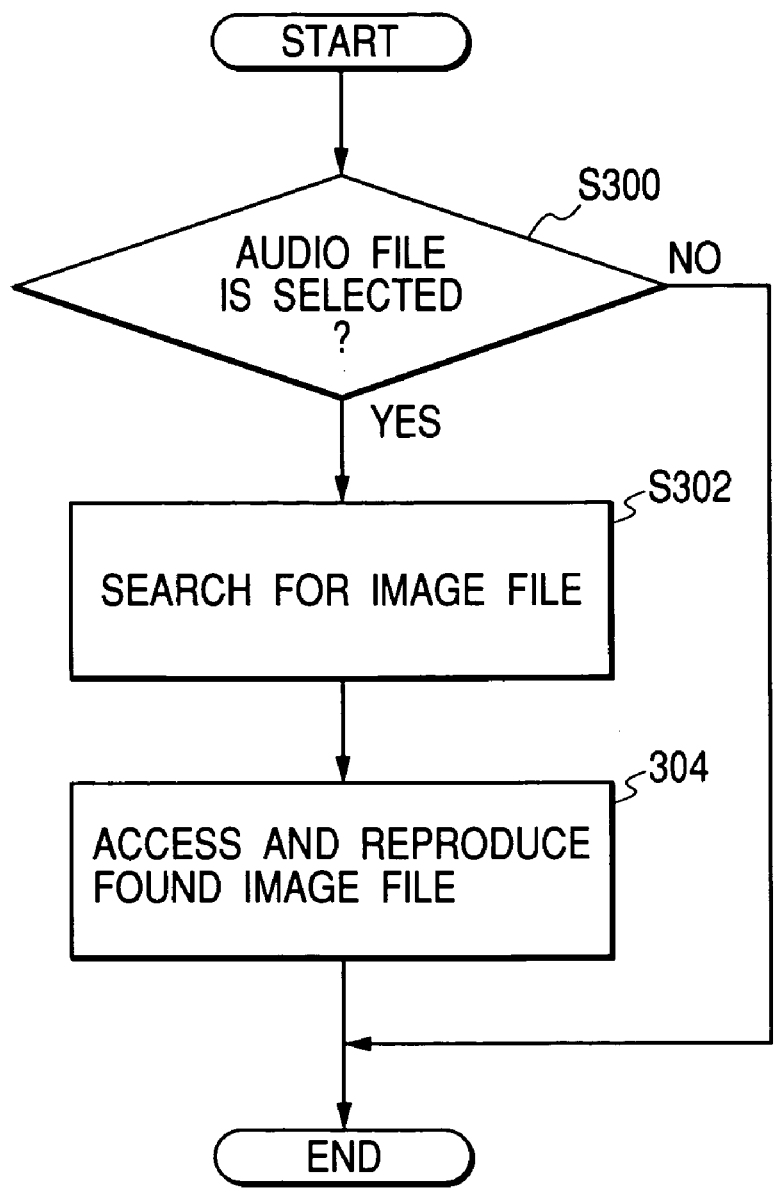

COMPUTER PROGRAM FOR GENERATING PICTURES

BACKGROUND OF THE INVENTION

1. Field of the Invention

This invention relates to a computer program for generating pictures such as animation pictures to be indicated on a display. In addition, this invention relates to a computer program for reproducing pictures such as animation pictures. Furthermore, this invention relates to a method and an apparatus for generating animation pictures to be indicated on a display. Also, this invention relates to a method and an apparatus for reproducing animation pictures.

2. Description of the Related Art

A front panel of a main unit in a prior-art car audio system has a knob, buttons, a disc insertion/ejection opening, and a display. The display can indicate time, the name of a tune currently played back, and an animation picture or a moving picture which can be updated on a frame-by-frame basis.

Specifically, a maker of the prior-art car audio system previously generates animation pictures by the use of computer graphics, and a memory within the system is pre-loaded with data representative of the generated animation pictures. The animation-picture data are read out from the memory before being indicated on the display. The prior-art car audio system has problems as follows. In the prior-art car audio system, a user can select the type of animation pictures to be indicated on the display from only several types. It is difficult for the user to make animation pictures. In addition, a complicated setting procedure is necessary to play back audio data and animation pictures while relating them to each other.

Japanese patent application publication number 62-177581/1987 discloses a display apparatus including a display portion, a portable memory card, and a controller. The display portion uses a light emitting diode, a plasma display panel, a neon lamp, or a liquid crystal display panel. The memory card includes, for example, an IC card. The memory card stores display data (data to be indicated), and an indication-related program. The controller includes a CPU.

The display apparatus in Japanese application 62-177581/1987 operates as follows. The display data stored in the memory card represent characters and patterns. The display data are subjected to image processing by the CPU in the controller before being indicated on the display portion. The indication-related program contains information about various indication formats. Simple animation pictures can be indicated according to a previously-generated program stored in the controller. The replacement of the memory card by new one causes a change in the display data and the indication-related program. The display data may be replaced by audio data, and the contents of music and a message may be recorded and played back in synchronism with a picture.

Japanese application 62-177581/1987 also discloses a data writing system including a display apparatus and a data writer. The display apparatus has a display portion, a controller, and an IC memory. Display data representative of characters and patterns are stored in the IC memory. The display data are read out from the IC memory and are subjected to image processing by the controller before being indicated on the display portion. The indication is of a type selected from a still type and a scroll type. When the data writer is connected with the IC memory, display data representative of free patterns can be written into the IC card by operating a keyboard on the data writer.

Japanese patent application publication number 11-311522/1999 discloses an operation device of an on-vehicle apparatus which includes a remote control unit, a computer-based controller, and a display. Command signals can be inputted to the computer-based controller via the remote control unit. In response to an inputted command signal, the computer-based controller changes a picture indicated on the display. A consideration is given of the case where a first picture indicated on the display has first, second, and third selection areas at upper, lower, and left places and a composite area at a right place. The composite area is composed of sub areas expressing functions of "other", "VICS", and "FM multiplexing". In this case, when a command signal corresponding to a rightward direction and designating the composite area is inputted, the first picture is replaced by a second picture having separate areas expressing functions of "other", "VICS", and "FM multiplexing" at upper, right, and lower places. Specifically, the composite area in the first picture splits into the separate areas in the second picture on a step-by-step motion basis. The second picture has a new composite area at a left place. The first and third selection areas in the first picture move toward and collect around the second selection area on a step-by-step motion basis so that the first, second, and third selection areas constitute the new composite area in the second picture. Thus, the separation of the composite area and the collection of the selection areas can be displayed like an animation.

SUMMARY OF THE INVENTION

A general object of this invention is to solve the previously-indicated problems in the prior-art car audio system.

It is a first specific object of this invention to provide an improved computer program for generating pictures such as animation pictures to be indicated on a display.

It is a second specific object of this invention to provide an improved computer program for reproducing pictures such as animation pictures.

It is a third specific object of this invention to provide an improved method of generating animation pictures to be indicated on a display.

It is a fourth specific object of this invention to provide an improved apparatus for generating animation pictures to be indicated on a display.

It is a fifth specific object of this invention to provide an improved method of reproducing animation pictures.

It is a sixth specific object of this invention to provide an improved apparatus for reproducing animation pictures.

A first aspect of this invention provides a computer program for generating animation pictures which comprises the steps of designating a first area in a source picture; designating a second area in the source picture; generating a start picture from a portion of the source picture which extends in the first area; generating an end picture from a portion of the source picture which extends in the second area; designating at least one third area in the source picture, the third area extending between the first and second areas; generating an intermediate picture from a portion of the source picture which extends in the third area; generating an image file of a prescribed format which contains data representative of animation pictures including the start picture, the intermediate picture, and the end picture; relating the image file with an audio file containing data representative of audio information; generating a file group including the image file and the audio file; and recording the file group on a recording medium.

A second aspect of this invention provides a computer program for generating animation pictures which comprises the steps of designating a first area in a source picture; designating a second area in the source picture; generating a start picture from a portion of the source picture which extends in the first area; generating an end picture from a portion of the source picture which extends in the second area; combining a portion of the start picture and a portion of the end picture into an intermediate picture; generating an image file of a prescribed format which contains data representative of animation pictures including the start picture, the intermediate picture, and the end picture; relating the image file with an audio file containing data representative of audio information; generating a file group including the image file and the audio file; and recording the file group on a recording medium.

A third aspect of this invention provides a computer program for generating animation pictures which comprises the steps of designating a first area in a source picture; designating a second area in the source picture; generating a start picture from a portion of the source picture which extends in the first area; generating an end picture from a portion of the source picture which extends in the second area; designating at least one third area in the source picture, the third area extending between the first and second areas; generating an intermediate picture from a portion of the source picture which extends in the third area; generating an image file of a prescribed format which contains data representative of animation pictures including the start picture, the intermediate picture, and the end picture; relating the image file with an audio file containing data representative of audio information; generating a file group including the image file and the audio file; and transmitting the file group toward an external device.

A fourth aspect of this invention provides a computer program for generating animation pictures which comprises the steps of designating a first area in a source picture; designating a second area in the source picture; generating a start picture from a portion of the source picture which extends in the first area; generating an end picture from a portion of the source picture which extends in the second area; combining a portion of the start picture and a portion of the end picture into an intermediate picture; generating an image file of a prescribed format which contains data representative of animation pictures including the start picture, the intermediate picture, and the end picture; relating the image file with an audio file containing data representative of audio information; generating a file group including the image file and the audio file; and transmitting the file group toward an external device.

A fifth aspect of this invention provides a computer program for reproducing animation pictures which comprises the steps of deciding whether or not an audio file containing data representative of audio information is selected as an object to be reproduced; accessing an image file in a file group in which the audio file is included when it is decided that the audio file is selected as an object to be reproduced, the image file containing data representative of animation pictures; and reproducing the accessed image file.

A sixth aspect of this invention provides a method of generating animation pictures which comprises the steps of designating a first area in a source picture; designating a second area in the source picture; cutting a portion, which extends in the first area, from the source picture to generate a start picture; cutting a portion, which extends in the second area, from the source picture to generate an end picture; designating at least one third area in the source picture, the third area extending between the first and second areas; cutting a portion, which extends in the third area, from the source picture to generate an intermediate picture; generating an image file which contains data representative of animation pictures including the start picture, the intermediate picture, and the end picture; relating the image file with an audio file containing data representative of audio information; and generating a file group including the image file and the audio file.

A seventh aspect of this invention is based on the sixth aspect thereof, and provides a method further comprising the step of recording the file group on a removable recording medium.

An eighth aspect of this invention provides an apparatus for generating animation pictures which comprises first means for designating a first area in a source picture; second means for designating a second area in the source picture; third means for cutting a portion, which extends in the first area designated by the first means, from the source picture to generate a start picture; fourth means for cutting a portion, which extends in the second area designated by the second means, from the source picture to generate an end picture; fifth means for designating at least one third area in the source picture, the third area extending between the first and second areas; sixth means for cutting a portion, which extends in the third area designated by the fifth means, from the source picture to generate an intermediate picture; seventh means for generating an image file which contains data representative of animation pictures including the start picture, the intermediate picture, and the end picture; eighth means for relating the image file generated by the seventh means with an audio file containing data representative of audio information; and ninth means for generating a file group including the image file and the audio file.

A ninth aspect of this invention is based on the eighth aspect thereof, and provides an apparatus further comprising tenth means for recording the file group generated by the ninth means on a removable recording medium.

A tenth aspect of this invention provides a method of reproducing animation pictures which comprises the steps of deciding whether or not an audio file containing data representative of audio information is selected as an object to be reproduced; accessing an image file in a file group in which the audio file is included when it is decided that the audio file is selected as an object to be reproduced, the image file containing data representative of animation pictures; and reproducing the accessed image file.

An eleventh aspect of this invention provides an apparatus for reproducing animation pictures which comprises first means for deciding whether or not an audio file containing data representative of audio information is selected as an object to be reproduced; second means for accessing an image file in a file group in which the audio file is included when the first means decides that the audio file is selected as an object to be reproduced, the image file containing data representative of animation pictures; and third means for reproducing the image file accessed by the second means.

BRIEF DESCRIPTION OF THE DRAWINGS

FIG. 13 is a diagram of a first folder containing an image file and an audio file.

FIG. 14 is a diagram of a second folder containing an image file and a plurality of audio files.

FIG. 15 is a diagram of the structure of an image file.

FIG. 16 is a diagram of a third folder containing an audio file, a picture access file, and an image-file folder.

FIG. 17 is a diagram of a fourth folder containing an audio file and an image file.

FIG. 18 is a diagram of a fifth folder containing audio files, image files, and a relation indicator file.

FIG. 23 is a flowchart of an example of a segment of a computer program for reproducing animation pictures.

DETAILED DESCRIPTION OF THE INVENTION

A picture generation system in an embodiment of this invention enables a user to generate pictures (images) to be indicated on a display panel of a contents playback apparatus such as an audio playback apparatus or an on-vehicle audio apparatus. An example of the on-vehicle audio apparatus is a car audio apparatus. The generated pictures include, for example, animation pictures having a succession of frames which corresponds to a playback time of several seconds.

According to the picture generation system, data representative of the generated pictures and also contents information such as audio information are stored in a recording medium. Then, the recording medium is set in the contents playback apparatus. When the contents information is designated in the contents playback apparatus or when the contents information is reproduced from the recording medium by the contents playback apparatus, the picture data are also reproduced from the recording medium and are indicated on the display of the contents playback apparatus. Alternatively, the reproduced picture data and the contents information may be directly transferred from the picture generation system to a memory or a storage unit in the contents playback apparatus. In this case, when the contents playback apparatus is turned on or when the contents playback apparatus is operated in a prescribed way concerning the contents information, the picture data are read out from the memory or the storage unit and are indicated on the display of the contents playback apparatus.

Regarding the picture generation system, there are a method of generating animation pictures (images), a method of storing data representative of the generated animation pictures into the recording medium, and a method of using the animation pictures in the contents playback apparatus.

The method of generating animation pictures is designed as follows. Portions are cut from a source picture. The cut portions are designated as a start picture and an end picture, respectively. Preferably, the cut portions are rectangular. Intermediate pictures, that is, 1-frame-corresponding pictures to be temporally placed between the start picture and the end picture, are generated. Data representing a set of the start picture, the intermediate pictures, and the end picture are stored into a recording medium. The method of generating animation pictures is implemented by an exclusive hardware or a personal computer.

Figure 1:
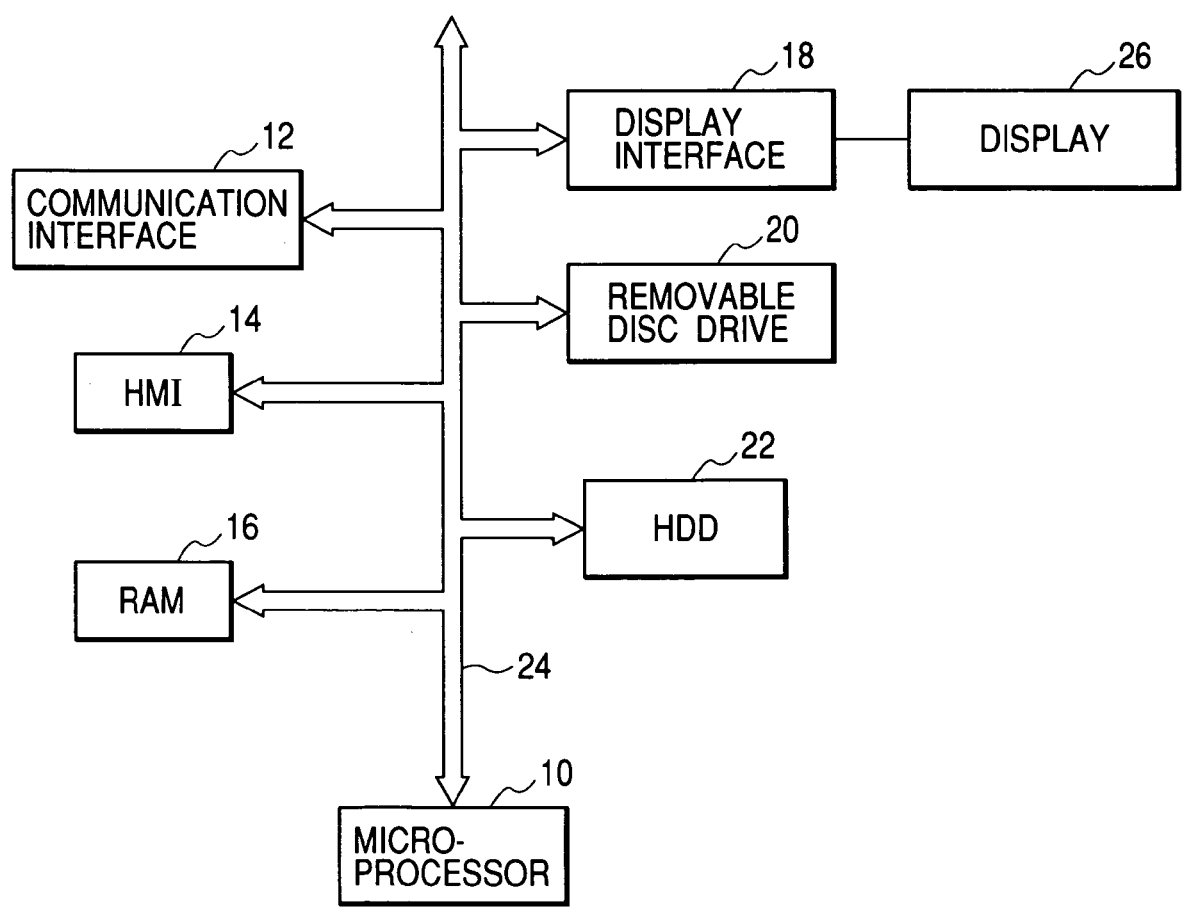
FIG. 1 is a block diagram of a personal computer which stores a computer program for generating animation pictures, and which operates as a picture generation apparatus according to an embodiment of this invention.

FIG. 1 shows a personal computer which stores a computer program for generating animation pictures, and which operates as a picture generation apparatus (an image generation apparatus). As shown in FIG. 1, the personal computer includes a microprocessor or a CPU 10, a communication interface 12, a human interface 14, a RAM 16, a display interface 18, a removable-disc drive 20, and a hard-disc drive 22 which are connected by a bus 24.

The microprocessor 10 implements the processing of data and information. The communication interface 12 implements communications with an external device. The human interface 14 is provided with user-operated input devices such as a keyboard and a mouse. The RAM 16 stores data and information to be processed by the microprocessor 10, and data and information resulting from the processing by the microprocessor 10. The display interface 18 drives a display device 26 provided in or outside the main body of the personal computer. The display device 26 indicates the results of the processing by the microprocessor 10 and also an operation procedure. The removable-disc drive 20 actuates a removable disc (a recording medium) such as a CD-R, a CD-RW, a DVD-R, a DVD-RW, or a DVD-RAM. The hard-disc drive 22 contains a hard disc (a recording medium) storing various data and a computer program for the processing by the microprocessor 10.

Data and information are transmitted among the devices 10, 12, 14, 16, 18, 20, and 22 via the bus 24. The computer program in the recording medium within the hard-disc drive 22 includes a computer program for generating animation pictures (images). For example, the computer program for generating animation pictures is downloaded from a removable disc to the recording medium within the hard-disc drive 22 through the removable-disc drive 20 and the bus 24. Alternatively, the computer program for generating animation pictures may be downloaded from a communication network, the Internet, or a broadcasting station to the recording medium within the hard-disc drive 22 through the communication interface 12 and the bus 24.

First, the user operates the personal computer to start the computer program for generating animation pictures which is stored in the recording medium within the hard-disc drive 22. When the computer program is started, the personal computer starts operating in accordance therewith. After the computer program is started, operation of the personal computer and user's actions are as follows. Visual information relating to picture generation (image generation) is indicated on the display device 26. The indicated visual information contains a pointer. The user generates pictures (images) while monitoring the visual information indicated on the display device 26 and operating the human interface 14 to move the pointer, to click a selected portion, and to input data.

Figure 2:
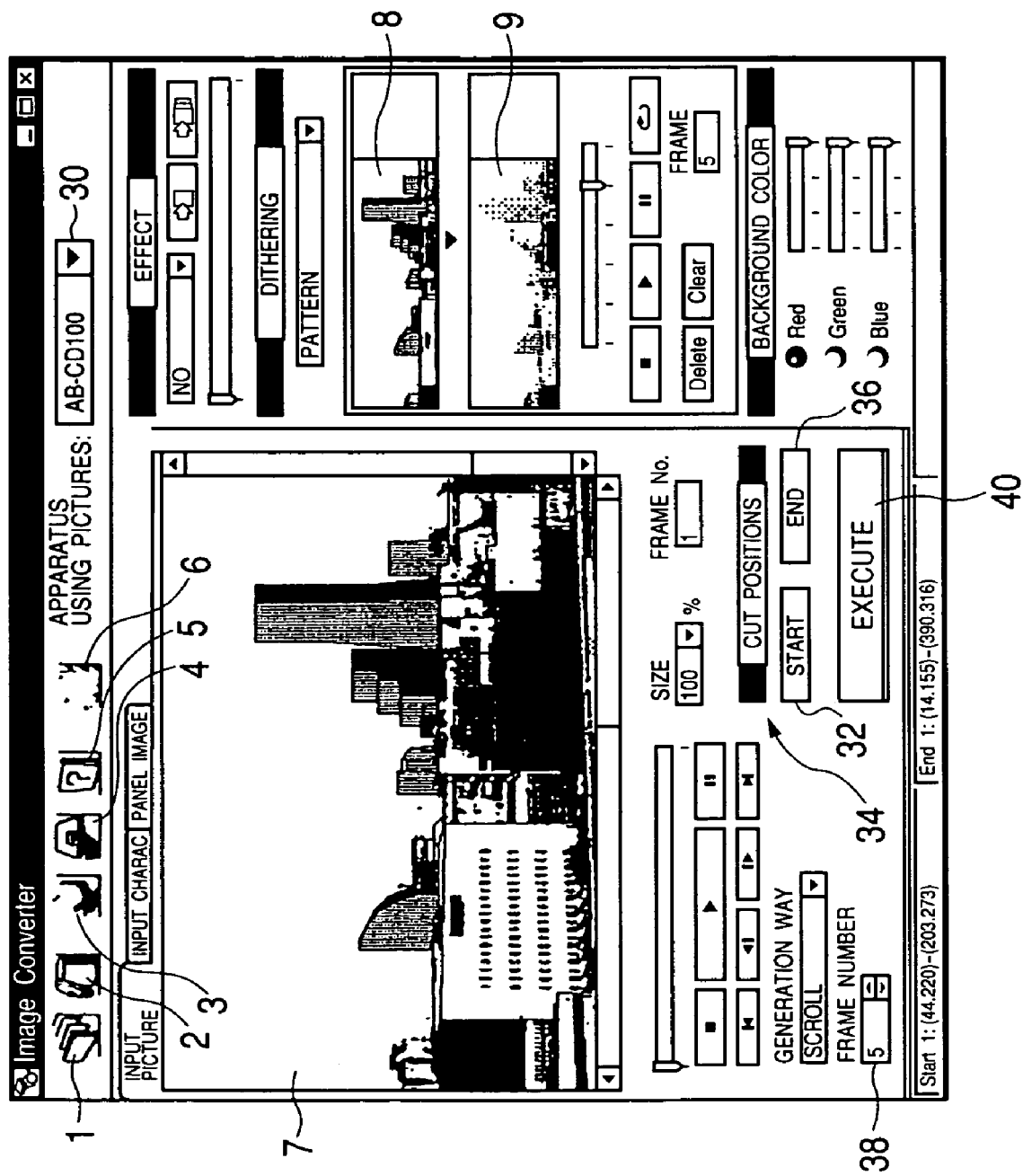
FIG. 2 is a diagram of a main window which is indicated on a display device of the personal computer in FIG. 1 when the computer program for generating animation pictures is started.

In more detail, when the computer program for generating animation pictures is started, the display device 26 is controlled to indicate a main window having contents shown in FIG. 2. The left-hand side of an upper area in the main window has a group of icons 1, 2, 3, 4, 5, and 6 corresponding to prescribed image-related operations respectively. When one of the icons 1-6 is clicked, a prescribed image-related operation corresponding to the clicked icon is implemented.

The icon 1 relates to inputting a picture (an image). When the icon 1 is clicked, a window for selecting a source picture (a material picture) is indicated on the display device 26. Thus, clicking the icon 1 means opening the source-picture selecting window. The source-picture selecting window lists files of source pictures (material pictures) which are stored in, for example, the recording medium within the hard-disc drive 22 or the recording medium within the removable-disc drive 20. When one of the source-picture files is selected, the source picture in the selected file is indicated on a large left-hand area (window) 7 in the screen of the display device 26. At this time, data representative of the selected source-file picture are read into the RAM 16. The icon 2 relates to deleting the indicated source picture.

The icon 3 relates to retrieving a previously-generated animation picture (image), the file of which is stored in, for example, the recording medium within the hard-disc drive 22 or the recording medium within the removable-disc drive 20. When the icon 3 is clicked, a window for selecting a previously-generated animation picture is indicated on the display device 26. The previous-picture selecting window lists files of previously-generated animation pictures. When one of the previous-picture files is selected, the previously-generated animation picture in the selected file is indicated on small left-hand regions (windows) 8 and 9 in the screen of the display device 26. The indicated previously-generated animation picture can be modified in various ways. Specifically, the indicated previously-generated animation picture can be changed in contrast or background color. Characters can be added to the indicated previously-generated animation picture. In this case, the original picture is indicated on the window 8 while the modification-result picture is indicated on the window 9.

The windows 8 and 9 are also used to indicate a currently-generated animation picture (image). The window 8 indicates the original picture while the window 9 indicates a picture which is modified from the original picture in color number or gradation so that it can be in harmony with the display panel of a destination apparatus. The destination apparatus means an apparatus using generated pictures (images) or an apparatus reproducing the generated pictures.

The icon 4 relates to saving the file of generated animation pictures or modification-result animation pictures. The icon 5 relates to reading out a help.

The icon 6 links with a home page on the Internet which provides source pictures (material pictures). When the icon 6 is clicked, a browser enables the home page to be indicated on the display device 26. At least one can be selected from the sour pictures in the home page. The file of the selected source picture can be downloaded into the recording medium within the hard-disc drive 22. The downloaded source picture can be used to generate animation pictures.

The main window in FIG. 2 has a selection menu 30 extending rightward of the group of the icons 1-6. The selection menu 30 enables the user to notify the personal computer of a destination apparatus, that is, an apparatus using generated pictures (images). Generally, apparatuses using generated pictures have display panels which are different from each other in color indication performance and number of pixels composing a 1-frame picture. For example, the display panel of a first apparatus is of a monochrome type with 160 by 54 dots and a 4-step gradation while that of a second apparatus is of an RGB type with 240 by 64 dots and a 8-step per-color gradation. The selection menu 30 can list the names (the types) of apparatuses. The user can select one from the apparatus names as a destination while referring to the selection menu 30. When selection is carried out, the personal computer is notified of the selected apparatus (the destination apparatus). The personal computer responds to the notification of the selected apparatus. Specifically, an initial value of the size of portions to be cut from a source picture to generate start and end pictures (images) are set in accordance with the display panel of the selected apparatus. The size of the cut portions can be changed by the user. In the absence of change of the size of the cut portions by the user, the files of start and end pictures having sizes equal to the initial value can be saved before transferred to the destination apparatus (the apparatus using generated pictures).

As the size of the cut portions is changed by the user, the cut-result pictures are expanded or reduced into the size corresponding to the display panel of the destination apparatus. The expansion-result or reduction-result pictures are start and end pictures. The files of the start and end pictures can be saved before being transferred to the destination apparatus. The gradation and color of each of the start and end pictures can be in harmony with the display panel of the destination apparatus.

It should be noted that the selection menu 30 may be omitted from the main window in FIG. 2.

Figure 3:
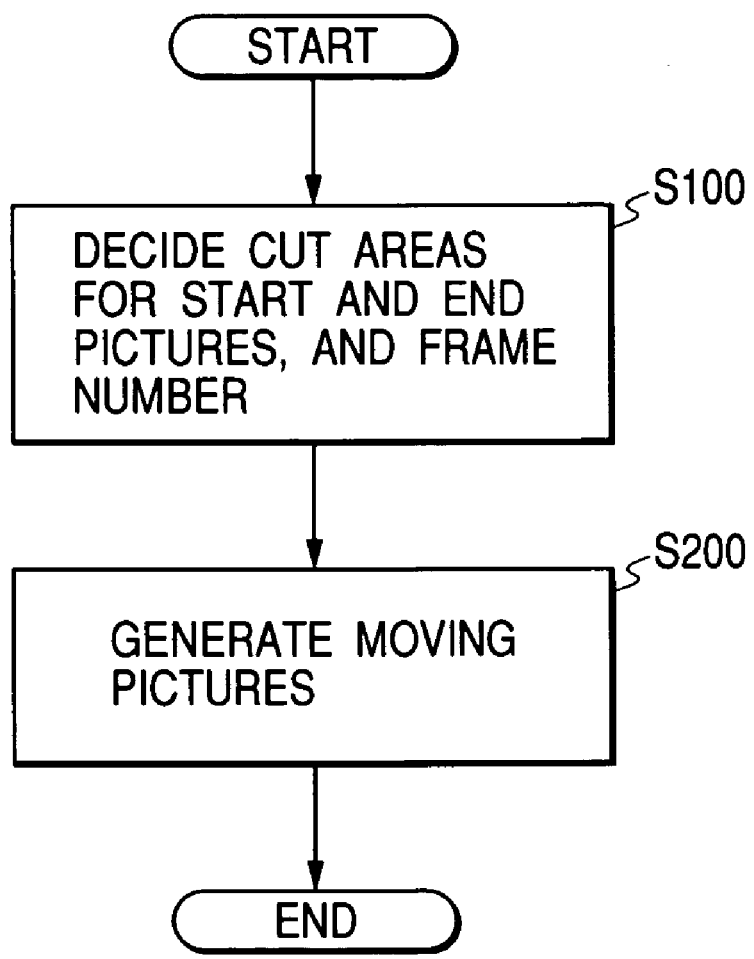
FIG. 3 is a flowchart of the computer program for generating animation pictures.

FIG. 3 is a flowchart of the computer program for generating animation pictures. With reference to FIG. 3, when the computer program is started, the program advances to a block S100 for deciding portions or areas to be cut from a source picture to generate start and end pictures, and for deciding the number of frames of animation. As will be indicated later, the frame number is denoted by "n". A block S200 following the block S100 generates a file of moving pictures (animation pictures or images). After the block S200, the computer program is ended.

Figure 4:
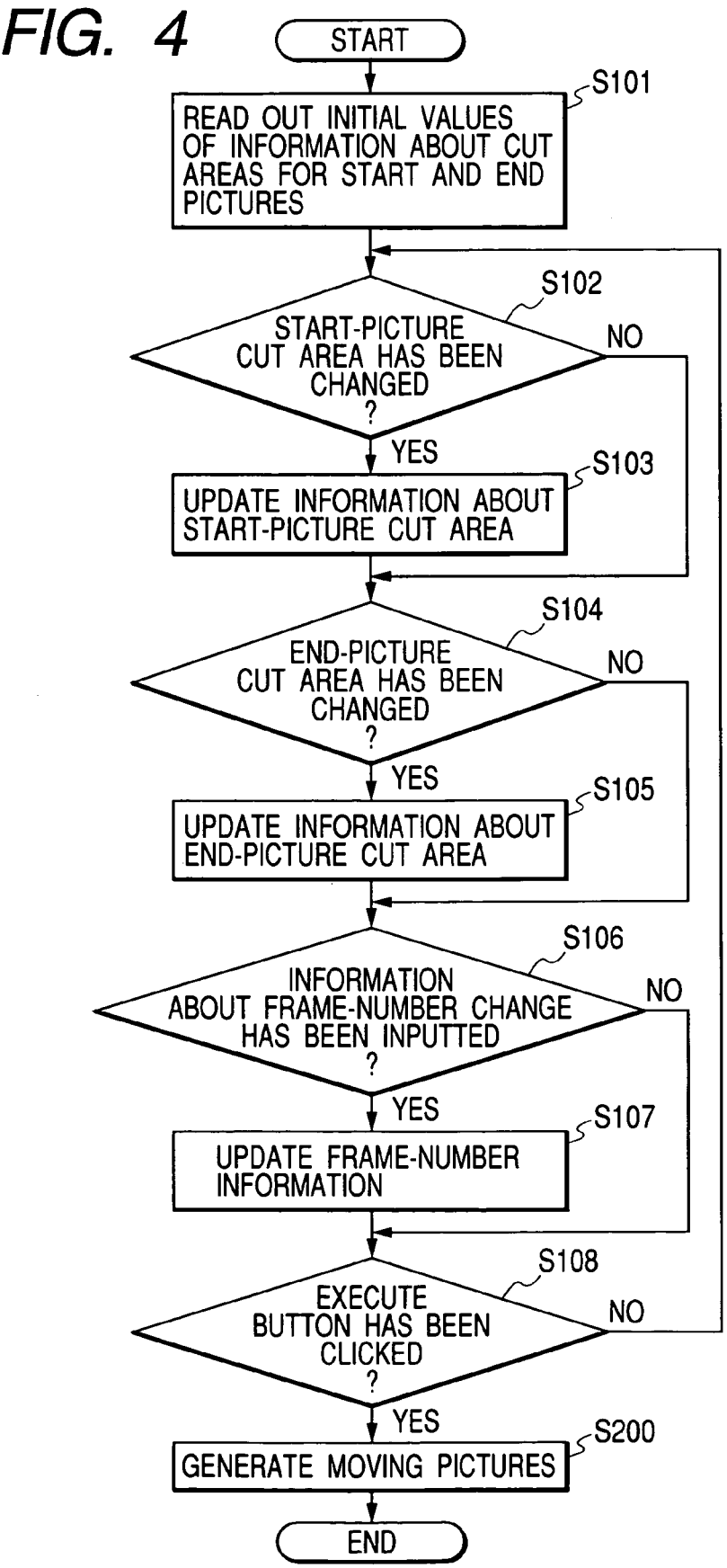
FIG. 4 is a flowchart of a first segment of the computer program which is contained in a block of FIG. 3.

FIG. 4 is a flowchart of a first segment of the computer program which is contained in the block S100 of FIG. 3. With reference to FIG. 4, a first step S101 in the first segment of the computer program sets initial values of parameters for designating rectangular portions or areas to be cut from a source picture to generate start and end pictures. Specifically, information about prescribed different rectangular areas (portions) is previously stored in, for example, the recording medium within the hard-disc drive 22 together with the computer program for generating animation pictures. The area information, that is, the information about the prescribed areas, corresponds to information about parameters. The step S101 reads out desired pieces of the area information from the recording medium. Then, the step S101 stores the read-out area information pieces into given addresses in the RAM 16 which are assigned to information about parameters for designating areas.

As previously mentioned, one apparatus name can be selected as a destination by referring to the selection menu 30. When selection is carried out, the personal computer is informed of the selected apparatus. Preferably, the step S101 reads out information pieces about parameters corresponding to the selected apparatus. Parameters for designating areas (portions) to be cut from a source picture to generate start and end pictures include the coordinates of the left-upper corners and the right-lower corners of the cut areas. The parameters may include the coordinates of the left-upper corners of the cut areas and the horizontal and vertical pixel numbers thereof.

An initial cut area for a start picture is equal to a rectangular area which has an upper-left corner coincident with the upper-left corner of the source picture, and which has horizontal and vertical dimensions corresponding to a pixel number suited for the display panel of a destination apparatus (an apparatus using generated pictures). An initial cut area for an end picture is similar to that for a start picture. The initial cut area for the end picture may be different in position from that for the start picture. Even in this case, the initial cut area for the end picture is similar in size to that for the start picture. After the step S101, the program advances to a step S102.

The step S102 decides whether or not an action of changing the cut area for a start picture has been taken by the user.

According to another segment of the computer program, when a start button 32 in a "cut area" section 34 in the main window of FIG. 2 is clicked, a current cut area for a start picture is superimposed on a source picture indicated in the main window. The current cut area can be moved relative to the indicated source picture by a dragging process using the mouse. When the pointer is moved to the edge of the current cut area by the use of the mouse, an inclined arrow appears at that position. The size of the current cut area can be varied as the inclined arrow is dragged by the mouse. The vertical or horizontal dimension of the current cut area can be changed as the corresponding side of the current cut area is dragged by the mouse. Even in the case where the cut area for a start picture has been changed, a cut-result start picture is expanded or reduced into the size corresponding to the display panel of the destination apparatus.

When the step S102 decides that an action of changing the cut area for a start picture has been taken by the user, the program advances from the step S102 to a step S103. Otherwise, the program jumps from the step S102 to a step S104.

The step S103 accesses the given addresses in the RAM 16 which are assigned to information pieces about parameters for designating a cut area for a start picture. The step S103 updates the information pieces held at the given addresses in accordance with information about the position of the change-result cut area for a start picture. After the step S103, the program advances to the step S104.

The step S104 decides whether or not an action of changing the cut area for an end picture has been taken by the user.

According to another segment of the computer program, when an end button 36 in the "cut area" section 34 in the main window of FIG. 2 is clicked, a current cut area for an end picture is superimposed on the source picture indicated in the main window. The current cut area for an end picture can be changed similarly to the change of the current cut area for a start picture. Even in the case where the cut area for an end picture has been changed, a cut-result end picture is expanded or reduced into the size corresponding to the display panel of the destination apparatus.

When the step S104 decides that an action of changing the cut area for an end picture has been taken by the user, the program advances from the step S104 to a step S105. Otherwise, the program jumps from the step S104 to a step S106.

The step S105 accesses the given addresses in the RAM 16 which are assigned to information pieces about parameters for designating a cut area for an end picture. The step S105 updates the information pieces held at the given addresses in accordance with information about the position of the change-result cut area for an end picture. After the step S105, the program advances to the step S106.

The step S106 decides whether or not information about a change in the number of frames has been inputted. The frame number is denoted by "n".

According to another segment of the computer program, when the contents of a "frame number" box 38 in the main window of FIG. 2 are changed by the user, information about a change in the number of frames is inputted. An initial value for the number of frames is equal to a prescribed value, for example, 10. The number of frames may be regarded as being indefinite until the user handles the "frame number" box 38. In this case, an "execute" button 40 for animation picture generation in the main window of FIG. 2 is made light in color so that the "execute" button 40 can be avoided from being clicked by the user. In this case, a message to urge the user to set the number of frames may be indicated on the main window.

When the step S106 decides that information about a change in the number of frames has been inputted, the program advances from the step S106 to a step S107. Otherwise, the program jumps from the step S106 to a step S108.

The step S107 accesses a given address in the RAM 16 which is assigned to an information piece about a parameter for designating the number of frames. The step S107 updates the information piece held at the given address in accordance with the information about the change in the number of frames. After the step S107, the program advances to the step S108.

The step S108 decides whether or not an action of executing animation picture generation has been taken by the user, that is, whether or not the "execute" button 40 in the main window of FIG. 2 has been clicked. When an action of executing animation picture generation has been taken, that is, when the "execute" button 40 has been clicked, the program advances from the step S108 to the block S200 for generating a file of animation pictures. Otherwise, the program returns to the step S102.

Animation pictures are generated in one of different ways including a scroll-based way and a wipe-based way.

Figure 5:
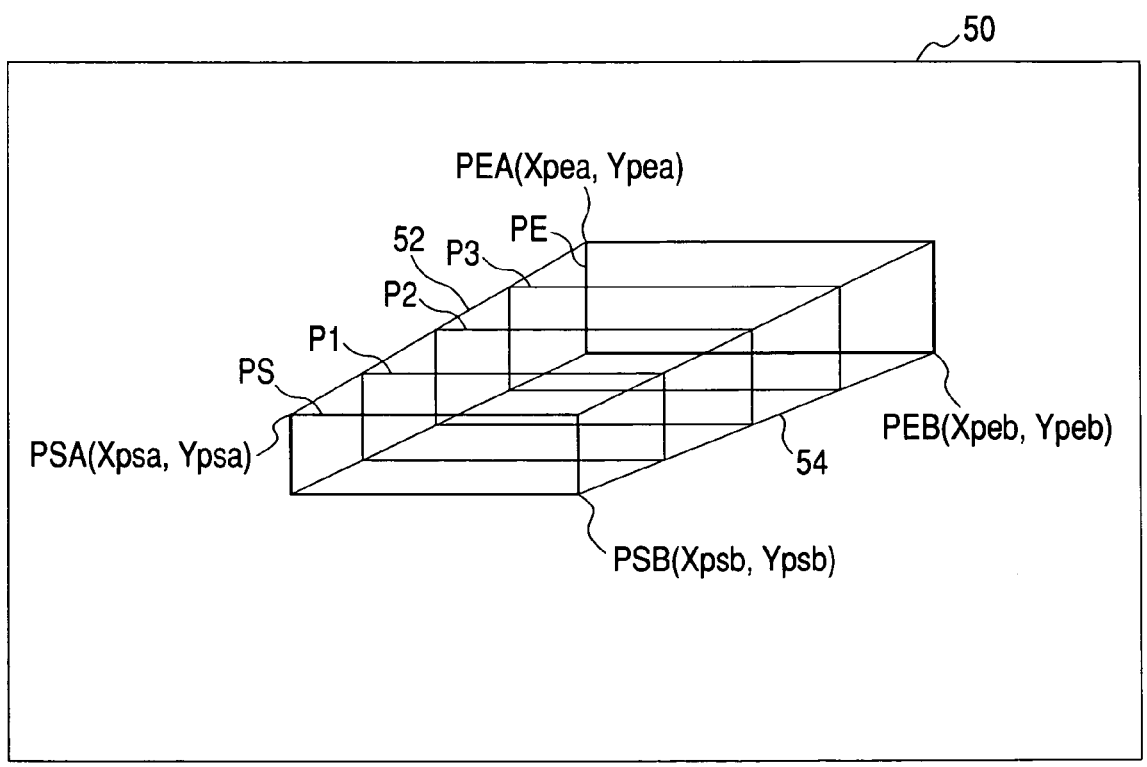
FIG. 5 is a diagram of a source picture in which cut areas for a start picture, an end picture, and intermediate pictures are defined and provided.

The scroll-based way is as follows. With reference to FIG. 5, there are a rectangular cut area PS for a start picture and a rectangular cut area PE for an end picture in a source picture 50. Three intermediate pictures P1, P2, and P3 are generated between the start picture and the end picture. Thus, 5-frame animation pictures are generated. The 5-frame animation pictures will be sequentially indicated on a frame-by-frame basis.

The cut area PS for a start picture is defined by the X-Y coordinates of its left-upper corner and right-lower corner. In FIG. 5, the coordinates of the left-upper corner of the cut area PS are denoted by PSA(Xpsa, Ypsa), and those of the right-lower corner thereof are denoted by PSB(Xpsb, Ypsb). A portion, which extends in the cut area PS, is cut from the source picture 50. The cut-result picture portion is set as a start picture.

The cut area PE for an end picture is defined by the X-Y coordinates of its left-upper corner and right-lower corner. In FIG. 5, the coordinates of the left-upper corner of the cut area PE are denoted by PEA(Xpea, Ypea), and those of the right-lower corner thereof are denoted by PEB(Xpeb, Ypeb). A portion, which extends in the cut area PE, is cut from the source picture 50. The cut-result picture portion is set as an end picture.

Portions of the source picture 50 which extend in rectangles (cut areas) are cut and set as the intermediate pictures P1, P2, and P3, respectively. The intermediate pictures P1, P2, and P3 are sequentially arranged in that order between the start picture and the end picture. The rectangle (the cut area) for the intermediate picture P1 is defined by the X-Y coordinates of its left-upper corner P1A and right-lower corner P1B. The coordinates of the left-upper corner P1A are denoted by (Xp1a, Yp1a) while those of the right-lower corner P1B are denoted by (Xp1b, Yp1b). The rectangle (the cut area) for the intermediate picture P2 is defined by the X-Y coordinates of its left-upper corner P2A and right-lower corner P2B. The coordinates of the left-upper corner P2A are denoted by (Xp2a, Yp2a) while those of the right-lower corner P2B are denoted by (Xp2b, Yp2b). The rectangle (the cut area) for the intermediate picture P3 is defined by the X-Y coordinates of its left-upper corner P3A and right-lower corner P3B. The coordinates of the left-upper corner P3A are denoted by (Xp3a, Yp3a) while those of the right-lower corner P3B are denoted by (Xp3b, Yp3b).

In FIG. 5, there are a straight line 52 connecting the left-upper corner PSA of the start-picture cut area PS and the left-upper corner PEA of the end-picture cut area PE, and a straight line 54 connecting the right-lower corner PSB of the start-picture cut area PS and the right-lower corner PEB of the end-picture cut area PE. The left-upper corners P1A, P2A, and P3A of the intermediate-picture rectangles are placed on the straight line 52 while the right-lower corners P1B, P2B, and P3B thereof are placed on the straight line 54. The left-upper corners of the start-picture cut area PS, the intermediate-picture rectangles, and the end-picture cut area PE are spaced at equal intervals. Also, the right-lower corners of the start-picture cut area PS, the intermediate-picture rectangles, and the end-picture cut area PE are spaced at equal intervals.

Therefore, the coordinates of the left-upper and right-lower corners P1A, P2A, P3A, P1B, P2B, and P3B of the intermediate-picture rectangles are given by the following equations.

$$P1A: Xp1a=(3 \cdot Xpsa+1 \cdot Xpea)/4, Yp1a=(3 \cdot Ypsa+1 \cdot Ypea)/4$$

$$P1B: Xp1b=(3 \cdot Xpsb+1 \cdot Xpeb)/4, Yp1b=(3 \cdot Ypsb+1 \cdot Ypeb)/4$$

$$P2A: Xp2a=(2 \cdot Xpsa+2 \cdot Xpea)/4, Yp2a=(2 \cdot Ypsa+2 \cdot Ypea)/4$$

$$P2B: Xp2b=(2 \cdot Xpsb+2 \cdot Xpeb)/4, Yp2b=(2 \cdot Ypsb+2 \cdot Ypeb)/4$$

$$P3A: Xp3a=(1 \cdot Xpsa+3 \cdot Xpea)/4, Yp3a=(1 \cdot Ypsa+3 \cdot Ypea)/4$$

$$P3B: Xp3b=(1 \cdot Xpsb+3 \cdot Xpeb)/4, Yp3b=(1 \cdot Ypsb+3 \cdot Ypeb)/4$$

Thus, the coordinates of the left-upper and right-lower corners P1A, P2A, P3A, P1B, P2B, and P3B of the intermediate-picture rectangles can be calculated from the coordinates of the left-upper and right-lower corners PSA, PSB, PEA, and PEB of the start-picture and end-picture cut areas PS and PE according to the forgoing equations.

In this way, the start-picture cut area PS, the end-picture cut area PE, and the intermediate-picture rectangles (the intermediate-picture cut areas) are decided.

When n-frame animation pictures are generated, the coordinates of the left-upper and right-lower corners PkA and PkB of a k-th intermediate-picture rectangle are given by the following equations.

$$PkA: Xpka=\{(n-1-k) \cdot Xpsa+k \cdot Xpea\}/(n-1)$$

$$Ypka=\{(n-1-k) \cdot Ypsa+k \cdot Ypea\}/(n-1)$$

$$PkB: Xpka=\{(n-1-k) \cdot Xpsb+k \cdot Xpeb\}/(n-1)$$

$$Ypkb=\{(n-1-k) \cdot Ypsb+k \cdot Ypeb\}/(n-1)$$

where "n" denotes a frame number preferably equal to or greater than 3, and "k" denotes an intermediate-picture ID number equal to a natural number variable from 1 to n−2. As the ID number "k" is smaller, the k-th intermediate-picture rectangle is closer to the start-picture cut area.

Figure 6:
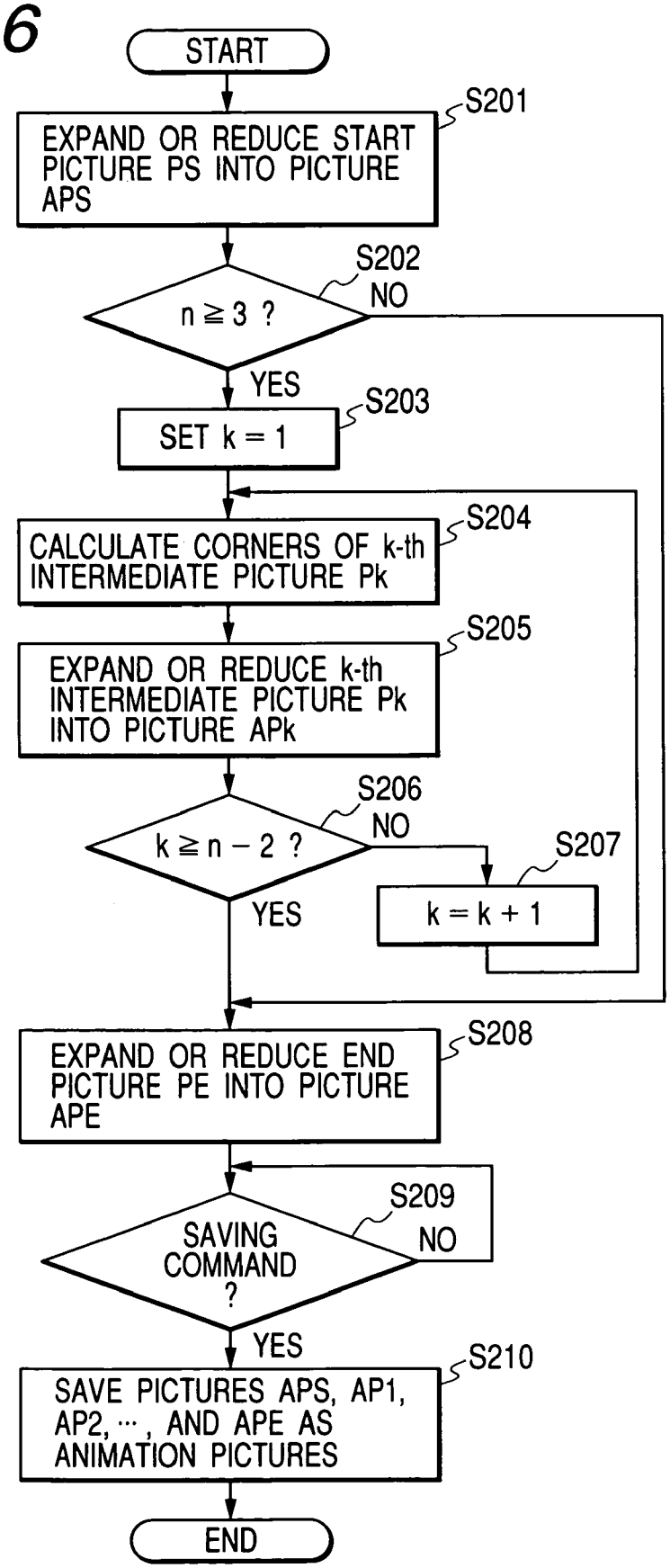
FIG. 6 is a flowchart of a second segment of the computer program which is contained in a block of FIGS. 3 and 4.
Figure 7:
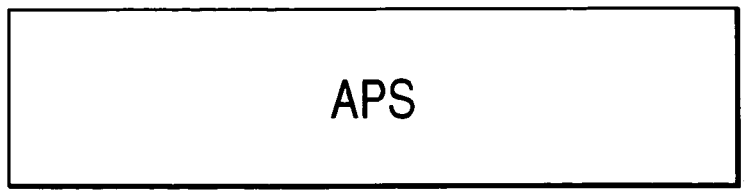
FIGS. 7, 8, 9, 10, and 11 are diagrams of a start picture, a first intermediate picture, a second intermediate picture, a third intermediate picture, and an end picture, respectively.
Figure 8:
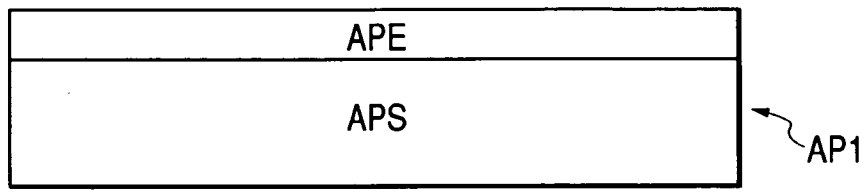
Figure 9:
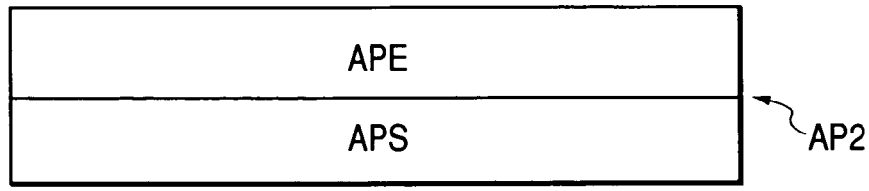
Figure 10:
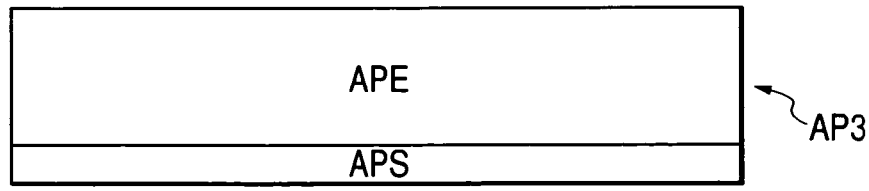
Figure 11:

FIG. 6 is a flowchart of a second segment of the computer program which is contained in the block S200 of FIGS. 3 and 4. When the "execute" button 40 in the main window of FIG. 2 is clicked, the second segment of the computer program is started.

With reference to FIG. 6, a first step S201 in the second segment of the computer program checks whether or not the user has changed the size of the cut area for a start picture PS (or every 1-frame animation picture) from the initial value which matches the display panel of the destination apparatus. When the user has changed the size of the cut area, the step S201 processes data representative of the cut-result picture (the cut-result start picture) to expand or reduce the cut-result picture into the size corresponding to the display panel of the destination apparatus. The step S201 implements the expansion or the reduction in each of the vertical and horizontal directions. The step S201 may increase or decrease the pixel number of the cut-result picture to the value corresponding to the display panel of the destination apparatus. The expansion or the reduction causes a change in aspect ratio. The aspect-ration change will provide a visual effect on the contents indicated on the display panel of the destination apparatus. The visual effect can be activated and deactivated according to user's choice.

Alternatively, the step S201 may process the data representative of the cut-result picture to delete an edge portion from the cut-result picture and shape the cut-result picture into harmony with the display panel of the destination apparatus.

The step S201 sets the expansion-result, reduction-result, or shaping-result picture as a finally-decided start picture APS. On the other hand, when the user has not changed the size of the cut area, the step S201 sets the cut-result picture as a finally-decided start picture APS. The step S201 stores data representative of the start picture APS (the expansion-result picture, the reduction-result picture, the shaping-result picture, or the cut-resultant picture) into the RAM 16. The step S201 may store the data into the recording medium within the hard-disc drive 22. In this way, the step S201 stores the data representative of the start picture APS, whose size matches the display panel of the destination apparatus, into the RAM 16 or the recording medium within the hard-disc drive 22.

A step S202 following the step S201 compares the frame number "n" with 3. When the frame number "n" is equal to or greater than 3, the program advances from the step S202 to a step S203. Otherwise, the program jumps from the step S202 to a step S208.

A frame number "n" of 1 may be forbidden. In this case, when the frame number "n" is 1, it is preferable to reject a saving command.

The step S203 sets a value "k" to 1. The value "k" corresponds to the intermediate-picture ID number "k". After the step S203, the program advances to a step S204.

The step S204 calculates the coordinates of the left-upper and right-lower corners of the k-th intermediate-picture rectangle (the k-th intermediate picture Pk), that is, the intermediate-picture cut area having an ID number equal to the value "k", from the coordinates of the left-upper and right-lower corners of the start-picture and end-picture cut areas in the previously-mentioned way.

A step S205 following the step S204 is similar to the step S201 except that an object to be processed is the k-th intermediate picture Pk rather than the start picture PS. Specifically, the step S205 checks whether or not the user has changed the cut-area size from the initial value. When the user has changed the cut-area size, the step S205 processes data representative of the k-th intermediate picture Pk to expand or reduce the k-th intermediate picture Pk. The step S205 may process the data representative of the k-th intermediate picture Pk to delete an edge portion from the k-th intermediate picture Pk and shape the k-th intermediate picture Pk. The step S205 sets the expansion-result, reduction-result, or shaping-result picture as a finally-decided k-th intermediate picture APk. On the other hand, when the user has not changed the cut-area size, the step S205 sets the k-th intermediate picture Pk as a finally-decided k-th intermediate picture APk. The step S205 stores data representative of the finally-decided k-th intermediate picture APk into the RAM 16 or the recording medium within the hard-disc drive 22.

A step S206 subsequent to the step S205 compares the value "k" with a number "n−2" (equal to the frame number "n" minus 2). When the value "k" is equal to or greater than the number "n−2", the program advances from the step S206 to the step S208. Otherwise, the program advances from the step S206 to a step S207.

The step S207 increments the value "k" by 1. After the step S207, the program returns to the step S204.

The step S208 is similar to the step S201 except that an object to be processed is the end picture PE rather than the start picture PS. Specifically, the step S208 checks whether or not the user has changed the cut-area size from the initial value. When the user has changed the cut-area size, the step S208 processes data representative of the cut-result picture (the cut-result end picture) to expand or reduce the cut-result picture. The step S208 may process the data representative of the cut-result picture to delete an edge portion from the cut-result picture and shape the cut-result picture. The step S208 sets the expansion-result, reduction-result, or shaping-result picture as a finally-decided end picture APE. On the other hand, when the user has not changed the cut-area size, the step S208 sets the cut-result picture as a finally-decided end picture APE. The step S208 stores data representative of the finally-decided end picture APE into the RAM 16 or the recording medium within the hard-disc drive 22. After the step S208, the program advances to a step S209.

In the case where the display panel of the destination apparatus has color indication performances lower than those related to the finally-decided pictures APS, APk (AP1, AP2, . . . ), and APE, the step S208 processes color-related segments of data representative of the finally-decided pictures APS, APk, and APE into harmony with the display panel of the destination apparatus. For example, the step S208 converts multi-color multi-gradation data representative of the pictures into corresponding monochrome 4-gradion data. The step S208 updates the data representative of the finally-decided pictures APS, APk, and APE in the RAM 16 or the recording medium within the hard-disc drive 22 in accordance with the process results. Specifically, the step S208 writes the process-result data over the original data representative of the finally-decided pictures APS, APk, and APE in the RAM 16 or the recording medium within the hard-disc drive 22. The step S208 indicates each original finally-decided picture and a corresponding update-result picture on the regions 8 and 9 in the main window of FIG. 2 respectively.

The step S209 checks whether or not the icon 4 in the main window of FIG. 2 is clicked to input a saving command. When the step S209 detects that the icon 4 is clicked, the program advances from the step S209 to a step S210. Otherwise, the step S209 is repeated.

The step S210 transfers the data representative of the finally-decided pictures APS, APk, and APE from the RAM 16 or the recording medium within the hard-disc drive 22 to a designated recording medium, and saves the finally-decided-picture data in the designated recording medium as image data of a prescribed format. The designated recording medium is either the recording medium within the hard-disc drive 22 or the recording medium within the removable-disc drive 20. For example, the recording medium within the removable-disc drive 20 is a CD-R, a CD-RW, a DVD-R, a DVD-RW, or a DVD-RAM. After the step S210, the second segment of the computer program ends.

The wipe-based way of generating animation pictures is as follows. During the indication of animation pictures generated in the wipe-based way, a start picture APS is replaced with an end picture APE on a downward wipe basis as shown in FIGS. 7-11. Three intermediate pictures AP1, AP2, and AP3 are generated between the start picture APS and the end picture APE. Thus, 5-frame animation pictures are generated. The 5-frame animation pictures will be sequentially indicated on a frame-by-frame basis.

In time domain, the intermediate pictures AP1, AP2, and AP3 are successively arranged in that order along the direction from the start picture APS toward the end picture APE. Each of the intermediate pictures AP1, AP2, and AP3 is divided along a horizontal line into an upper part occupied by a lower portion of the end picture APE and a lower part occupied by an upper portion of the start picture APS. As an intermediate picture is closer to the end picture APE, its division-result upper part increases while its division-result lower part decreases.

Figure 12:
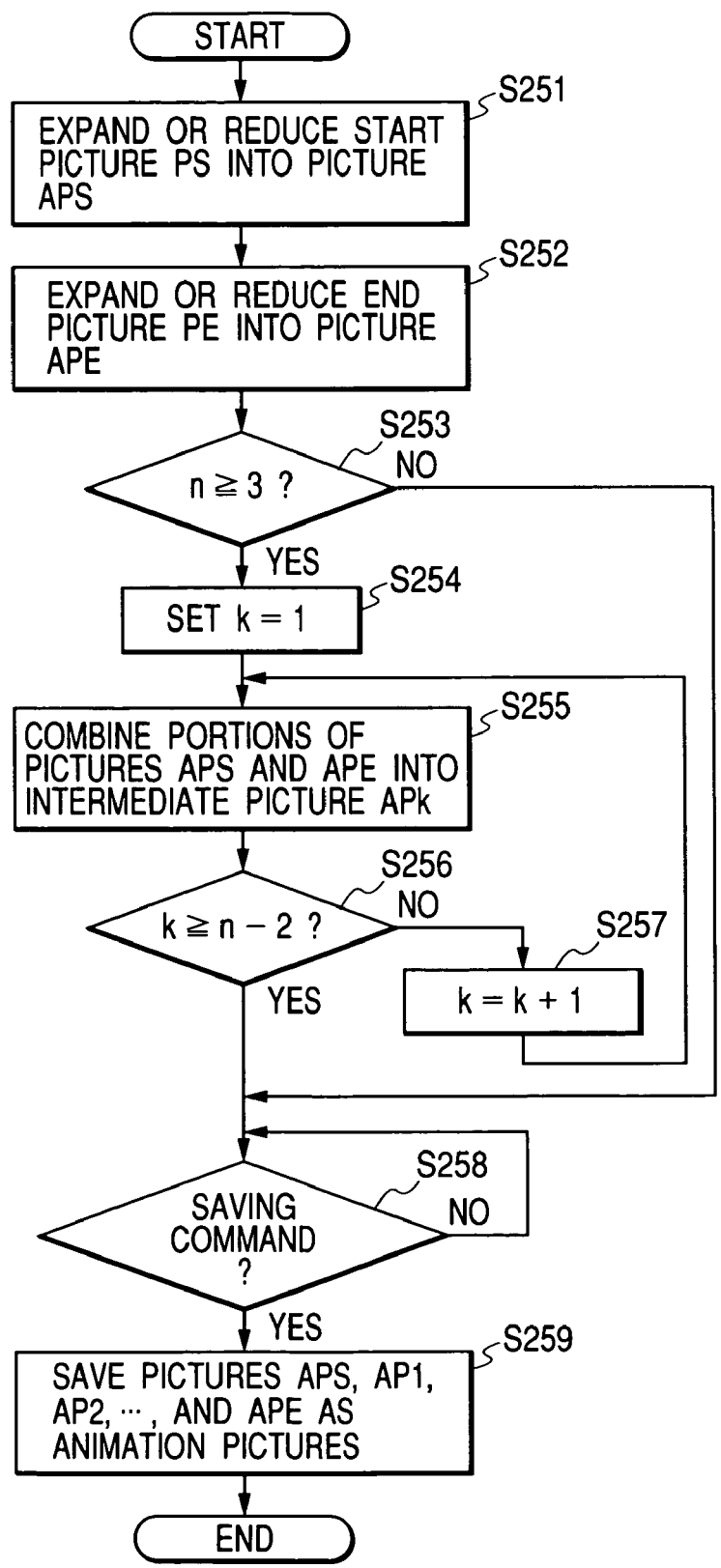
FIG. 12 is a flowchart of a segment of the computer program which replaces the program segment in FIG. 6.

FIG. 12 is a flowchart of a segment of the computer program which replaces the program segment in FIG. 6. When the "execute" button 40 in the main window of FIG. 2 is clicked, the program segment in FIG. 12 is started.

With reference to FIG. 12, a first step S251 in the segment of the computer program checks whether or not the user has changed the size of the cut area for a start picture PS (or every 1-frame animation picture) from the initial value which matches the display panel of the destination apparatus. When the user has changed the size of the cut area, the step S251 processes data representative of the cut-result picture (the cut-result start picture) to expand or reduce the cut-result picture into the size corresponding to the display panel of the destination apparatus. The step S251 implements the expansion or the reduction in each of the vertical and horizontal directions. The step S251 may increase or decrease the pixel number of the cut-result picture to the value corresponding to the display panel of the destination apparatus.

Alternatively, the step S251 may process the data representative of the cut-result picture to delete an edge portion from the cut-result picture and shape the cut-result picture into harmony with the display panel of the destination apparatus.

The step S251 sets the expansion-result, reduction-result, or shaping-result picture as a finally-decided start picture APS. On the other hand, when the user has not changed the size of the cut area, the step S251 sets the cut-result picture as a finally-decided start picture APS. The step S251 stores data representative of the start picture APS (the expansion-result picture, the reduction-result picture, the shaping-result picture, or the cut-resultant picture) into the RAM 16. The step S251 may store the data into the recording medium within the hard-disc drive 22. In this way, the step S251 stores the data representative of the start picture APS, whose size matches the display panel of the destination apparatus, into the RAM 16 or the recording medium within the hard-disc drive 22.

A step S252 following the step S251 is similar to the step S251 except that an object to be processed is the end picture rather than the start picture. Specifically, the step S252 checks whether or not the user has changed the cut-area size from the initial value. When the user has changed the cut-area size, the step S252 processes data representative of the cut-result picture (the cut-result end picture) to expand or reduce the cut-result picture. The step S252 may process the data representative of the cut-result picture to delete an edge portion from the cut-result picture and shape the cut-result picture. The step S252 sets the expansion-result, reduction-result, or shaping-result picture as a finally-decided end picture APE. On the other hand, when the user has not changed the cut-area size, the step S252 sets the cut-result picture as a finally-decided end picture APE. The step S252 stores data representative of the finally-decided end picture APE into the RAM 16 or the recording medium within the hard-disc drive 22.

A step S253 subsequent to the step S252 compares the frame number "n" with 3. When the frame number "n" is equal to or greater than 3, the program advances from the step S253 to a step S254. Otherwise, the program jumps from the step S253 to a step S258.

The step S254 sets a value "k" to 1. The value "k" corresponds to the intermediate-picture ID number "k". After the step S254, the program advances to a step S255.

The step S255 generates a k-th intermediate picture APk, that is, an intermediate picture having an ID number equal to the value "k", from the start picture APS and the end picture APE. Specifically, the k-th intermediate picture is divided along a horizontal line into an upper part occupied by a lower portion of the end picture APE and a lower part occupied by an upper portion of the start picture APS. The vertical dimension of the upper part corresponds to "k/(n−1)" while that of the lower part corresponds to "1-{k/(n−1)}". The step S255 stores data representative of the k-th intermediate picture APk into the RAM 16 or the recording medium within the hard-disc drive 22.

A step S256 following the step S255 compares the value "k" with a number "n−2" (equal to the frame number "n" minus 2). When the value "k" is equal to or greater than the number "n−2", the program advances from the step S256 to the step S258. Otherwise, the program advances from the step S256 to a step S257.

The step S257 increments the value "k" by 1. After the step S257, the program returns to the step S255.

The step S258 checks whether or not the icon 4 in the main window of FIG. 2 is clicked to input a saving command. When the step S258 detects that the icon 4 is clicked, the program advances from the step S258 to a step S259. Otherwise, the step S258 is repeated.

The step S259 transfers the data representative of the start, intermediate, and end pictures APS, APk (AP1, AP2, . . . ), and APE from the RAM 16 or the recording medium within the hard-disc drive 22 to a designated recording medium, and saves the picture data in the designated recording medium as image data of a prescribed format. The designated recording medium is either the recording medium within the hard-disc drive 22 or the recording medium within the removable-disc drive 20. After the step S259, the segment of the computer program ends.

The above-mentioned downward wipe means a wipe from the top to the bottom. The wipe from the top to the bottom may be replaced by a wipe from the bottom to the top, a wipe from the right to the left, a wipe from the left to the right, a wipe in an oblique direction, a wipe from the center with an expanding circular boundary, or a wipe from the center with an expanding diamond boundary.

Also, the wipe from the top to the bottom may be replaced by the following procedure. Each of intermediate pictures has a start-picture portion and random portions being a mosaic of the end picture. As an intermediate picture is closer to the end picture, its start-picture portion contracts while its random portions expand.

Furthermore, the wipe from the top to the bottom may be replaced by the following procedure. Each of intermediate pictures is generated by mixing the start picture and the end picture regarding the signal level related to luminance or color. As an intermediate picture is closer to the end picture, the mixing ratio is changed in the direction of increasing the end-picture-caused components.

Also, the wipe from the top to the bottom may be replaced by the following procedure. The start picture changes to the end picture, and then the end picture returns to the start picture.

Each of the step S210 in FIG. 6 and the step S259 in FIG. 12 relates the generated animation pictures with an audio file as explained below.

With reference to FIG. 13, there is an audio file "abcdf.mp3" in a storage unit or a recording medium within the destination apparatus. When the audio file "abcdf.mp3" is played back by the destination apparatus, or when the audio file "abcdf.mp3" is found as a result of a search in the destination apparatus, animation pictures are indicated on the display panel of the destination apparatus as a symbol of the audio file "abcdf.mp3". To implement the audio-responsive indication of the animation pictures, the animation pictures are previously related with the audio file "abcdf.mp3" in a given way.

In the personal computer, the given way of relating the animation pictures with the audio file "abcdf.mp3" is carried out by the step S210 in FIG. 6 or the step S259 in FIG. 12. An example of the given way is as follows. The audio file "abcdf.mp3" and an image file "aaa-xxxjmm" of the animation pictures are placed in a same file group (a same folder). The extension "jmm" denotes that the related file is an animation-picture file. As shown in FIG. 14, a plurality of audio files "abcdf.mp3", "xyz-123.mp3", and "opqrst.mp3", and an image file "aaa-xxxjmm" of the animation pictures may be placed in a same folder (a same file group). In this case, the image file "aaa-xxxjmm" is played back regardless of which of the plural audio files is selected as a result of the search. The image file "aaa-xxxjmm" has a structure shown in FIG. 15.

With reference to FIG. 16, there is an audio file "musicxyz.mp3" in a storage unit or a recording medium within the destination apparatus. When the audio file "musicxyz.mp3" is played back by the destination apparatus, or when the audio file "musicxyz.mp3" is found as a result of a search in the destination apparatus, animation pictures are indicated on the display panel of the destination apparatus as a symbol of the audio file "musicxyz.mp3". To implement the audio-responsive indication of the animation pictures, the animation pictures are previously related with the audio file "musicxyz.mp3" in a given way. In the personal computer, the given way is carried out by the step S210 in FIG. 6 or the step S259 in FIG. 12. The given way includes a process of substantially equalizing the names of the animation-picture file and the audio file except extension.

Specifically, a first example of the given way is as follows. The designated recording medium in the personal computer has the audio file "musicxyz.mp3". After animation pictures are generated by the use of the personal computer as previously mentioned, an image-file folder "musicxyz" is provided in the designated recording medium. Files of the generated animation pictures are named "musicxyz01.jma", "musicxyz02.jma", "musicxyz03.jma", "musicxyz04.jma", and "musicxyz05.jma", respectively. For example, each of the animation-picture files represents only a 1-frame picture. The animation-picture files are saved in the designated recording medium while being placed in the image-file folder "musicxyz". The extension "jma" denotes that the related file is an animation-picture file. The extension "jma" may be replaced by another extension. A file for accessing the animation pictures (the animation-picture files) is generated. The picture access file is named "musicxyz.jlk". The picture access file "musicxyz.jlk" is stored in the designated recording medium. As shown in FIG. 16, the audio file "musicxyz.mp3", the picture access file "musicxyz.jlk", and the image-file folder "musicxyz" are placed in a giant folder (a giant file group) provided on the designated recording medium.

A second example of the given way is as follows. With reference to FIG. 17, the designated recording medium in the personal computer has an audio file named "abcde.mp3". Animation pictures are generated by the use of the personal computer as previously mentioned. An image file of the generated animation pictures is named "abcde.jmm". The animation-picture file (the image file) "abcde.jmm" is saved in the designated recording medium. As shown in FIG. 15, the animation-picture file "abcde.jmm" is composed of sequentially-arranged segments loaded with header information, data representative of a start picture APS, data representative of a first intermediate picture AP1, data representative of a second intermediate picture AP2, data representative of a third intermediate picture AP3, and data representative of an end picture APE respectively. The header information has a piece indicating the number (the frame number) of related animation pictures, and a piece for accessing the animation pictures. As shown in FIG. 17, the audio file "abcde.mp3" and the image file "abcde.jmm" are placed in a same folder (a same file group) provided on the designated recording medium.

With reference to FIG. 18, the designated recording medium in the personal computer has audio files "abcdf.mp3", "xyz-123.mp3", and "opqrst.mp3". Another way of previously relating animation pictures with audio files is as follows. Animation pictures relating to the audio files "abcdf.mp3", "xyz-123.mp3", and "opqrst.mp3" are generated by the use of the personal computer as previously mentioned. Image files of the generated animation pictures are named "aaa-xxx.jmm", "bbb-yyy.jmm", and "ccc-zzz.jmm". The animation-picture files (the image files) "aaa-xxx.jmm", "bbb-yyy.jmm", and "ccc-zzz.jmm" are saved in the designated recording medium. A file for indicating or managing a relation among the audio files "abcdf.mp3", "xyz-123.mp3", and "opqrst.mp3", and the animation-picture files "aaa-xxxjmm", "bbb-yyy.jmm", and "ccc-zzz.jmm" is generated. The relation indicator file is named "audioanim.jlx". The extension "jlx" or the name is predetermined so as to denote that the related file is a relation indicator file. The relation indicator file "audioanim.jlx" is stored in the designated recording medium. As shown in FIG. 18, the audio files "abcdf.mp3", "xyz-123.mp3", and "opqrst.mp3", the image files "aaa-xxxjmm", "bbb-yyy.jmm", and "ccc-zzz.jmm", and the relation indicator file "audioanim.jlx" are placed in a same folder (a same file group) provided on the designated recording medium. Each of the animation-picture files "aaa-xxxjmm", "bbb-yyy.jmm", and "ccc-zzz.jmm" may be a set of a picture access file and a folder having image files representing respective 1-frame animation pictures.

Data representing generated animation pictures may be recorded on a CD-R as an intrinsic disc title. Data representing generated animation pictures may be installed on a destination apparatus (a contents playback apparatus). In this case, the animation pictures are indicated on the display panel of the destination apparatus when the destination apparatus is turned on or when a disc or a tune for which no animation picture is designated is played back. Preferably, the name or extension of an animation-picture file is predetermined so as to denote that the related file is an animation-picture file. Data representing types of files (animation-picture files) may be written in a relation indicator file of FIG. 18. In this case, by referring to the relation indicator file, animation-picture files can be recognized.

Data representing generated animation pictures may be directly saved in the recording medium within the removable-disc drive 20. An example of the recording medium is a CD-R. Alternatively, data representing generated animation pictures may be saved in a folder in the recording medium within the hard-disc drive 22 before being transferred and copied onto the recording medium within the removable-disc drive 20. A group of audio files and image files of generated animation pictures related with the audio files may be transmitted to a receiver unit in a destination apparatus (a contents playback apparatus) via the communication interface 12. A folder of audio files and image files of generated animation pictures related with the audio files may be transmitted to the receiver unit in the destination apparatus via the communication interface 12.

Figure 19:
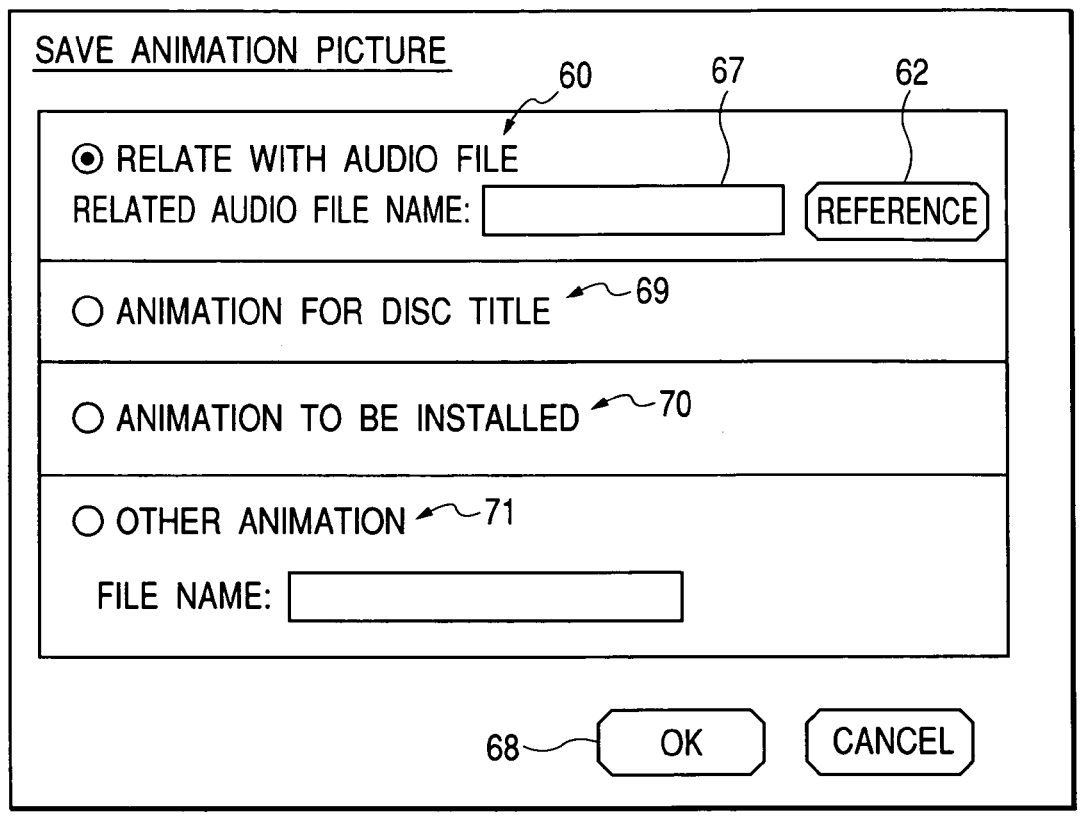
FIG. 19 is a diagram of a window which is indicated on the display device of the personal computer in FIG. 1 when a user takes an action of saving data representing generated animation pictures.
Figure 20:
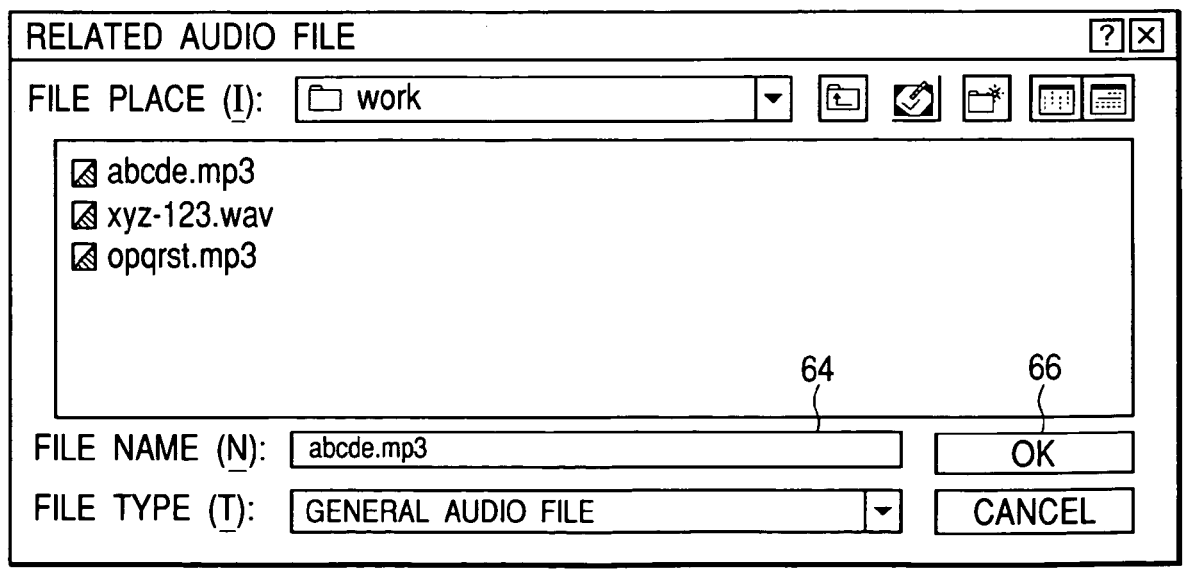
FIG. 20 is a diagram of another window indicated on the display device of the personal computer in FIG. 1.

In the case where the user takes an action of saving data representing generated animation pictures, the display device 26 is controlled to indicate a window shown in FIG. 19. When a segment 60 of "relate with audio file" is checked and a box 62 of "reference" is clicked in the window of FIG. 19, a new window in FIG. 20 is indicated on the display device 26. The window in FIG. 20 lists audio files in a designated folder (that is, a folder in which files of animation pictures are to be saved). When one of the audio files is selected by clicking, a file-name box 64 in the window of FIG. 20 indicates the name of the selected audio file ("abcde.mp3" in FIG. 20). As a result of clicking an OK button 66 in FIG. 20, the window of FIG. 20 disappears and a file-name box 67 in the "relate with audio file" section in the window of FIG. 19 indicates the name of the selected audio file ("abcde.mp3"). When an OK button 68 in the window of FIG. 19 is clicked, a file or files of animation pictures are saved while being automatically related with the selected audio file.

Specifically, in the given way regarding FIG. 16, a picture access file having a name of "abcde.jlk" and a folder having a name of "abcde" are generated. The folder "abcde" has files having names of "abcde01.jma", "abcde02.jma", . . . , and each representing a 1-frame picture. In the given way regarding FIG. 17, a file having a name of "abcde jmm" is generated as an animation-picture file.

The given way regarding FIG. 18 will further be explained hereafter. When an audio file ("abcde.mp3") with which generated animation pictures are to be related is designated and the OK button 68 is clicked in the window of FIG. 19, the display device 26 is controlled to indicate a window for designating the name of a file of generated animation pictures. When an image-file name ("aaa-xxxjmm") is designated and an OK button in the indicated window is clicked, the file of the generated animation pictures is saved as a file having the designated name "aaa-xxxjmm". At this time, information denoting that the audio file "abcde.mp3" and the animation-picture file "aaa-xxxjmm" are related with each other is written in the relation indicator file "audioanim.jlx". In the given way regarding FIG. 18, it is unnecessary to substantially equalize the names of an audio file and an animation-picture file except extension.

In the case where predetermined file names are assigned to animation for a disc title and animation to be installed regarding FIG. 18, when segments 69 and 70 of "animation for disc title" and "animation to be installed" in FIG. 19 are checked and the OK button 68 is clicked, animation-picture files having the predetermined file names are generated and saved. In the case where an action of relating an audio file and an animation-picture file with reach other is not taken upon the saving and is thus taken after the saving, a segment 71 of "other animation" is checked in the window of FIG. 19 and an arbitrary file name is inputted by the user. In this case, when the OK button 68 is clicked, an animation-picture file having the inputted file name is generated.

Preferably, a file or files of generated animation pictures and also an audio file or files are stored in a common folder designated by the user and provided in the recording medium within the hard-disc drive 22 according to the computer program for generating animation pictures. As the user operates the personal computer, the contents of the folder are copied and recorded from the recording medium within the hard-disc drive 22 onto the recording medium within the removable-disc drive 20. An example of the recording medium within the removable-disc drive 20 is a CD-R. The file or files of generated animation pictures and also the audio file or files may be directly recorded on the recording medium within the removable-disc drive 20 without being temporarily stored in the recording medium within the hard-disc drive 22. When the CD-R is inserted into and driven by an on-vehicle audio apparatus (a destination apparatus), music represented by an audio file or files in the CD-R is reproduced. At the same time, animation pictures represented by an image file or files related with the audio file or files are reproduced on the display panel of the on-vehicle audio apparatus.

Figure 21:
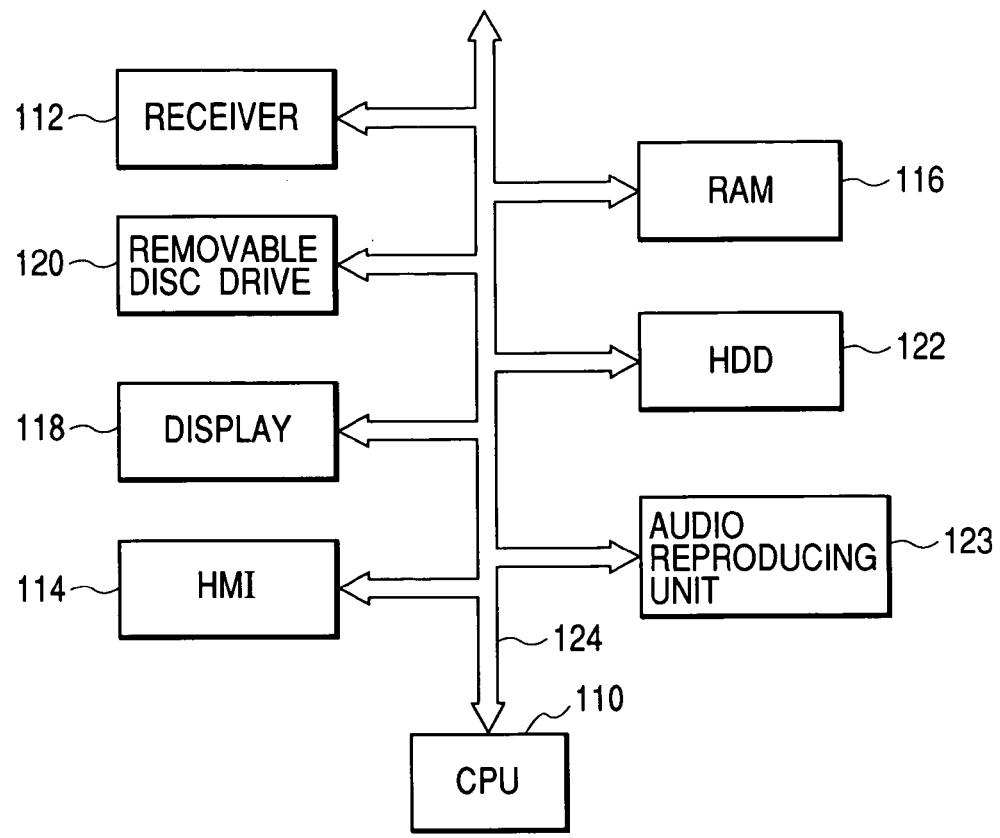
FIG. 21 is a block diagram of an on-vehicle audio apparatus which stores a computer program for reproducing animation pictures, and which operates as a picture reproducing apparatus.

FIG. 21 shows an on-vehicle audio apparatus which stores a computer program for reproducing animation pictures (images), and which operates as a picture reproducing apparatus (an image reproducing apparatus). As shown in FIG. 21, the on-vehicle audio apparatus includes a CPU 110, a receiver unit 112, a human interface 114, a RAM 116, a display panel 118, a removable-disc drive 120, a hard-disc drive 122, and an audio reproducing unit 123 which are connected by a bus 124.

The CPU 110 implements the processing of data and information for controlling potions of the on-vehicle audio apparatus. The receiver unit 112 receives, from an external device, information transmitted by a radio communication system such as a Blue tooth, a wireless LAN, or a mobile telephone. The human interface 114 is provided with user-operated input devices such as buttons, a knob, and a remote control device. The RAM 116 stores data and information to be processed by the CPU 110, and data and information resulting from the processing by the CPU 110. The display panel 118 indicates animation pictures (images). The removable-disc drive 120 actuates a removable disc (a recording medium) such as a CD-R, a CD-RW, a DVD-R, a DVD-RW, or a DVD-RAM. The hard-disc drive 122 contains a hard disc (a recording medium) storing various data and a computer program for the processing by the CPU 110. The computer program includes a computer program for reproducing animation pictures (images). Preferably, the recording medium within the hard-disc drive 122 is used to store data representing animation pictures. Information may be transferred and copied from the recording medium within the removable-disc drive 120 onto the recording medium of the hard-disc drive 122. The audio reproducing device 123 includes a signal processor and loudspeakers. Preferably, the loudspeakers are located outside a main unit of the on-vehicle audio apparatus. During a playback mode of operation of the on-vehicle audio apparatus, the audio reproducing device 123 processes audio information into an audio signal and converts the audio signal into corresponding sounds via the loudspeakers.

Figure 22:
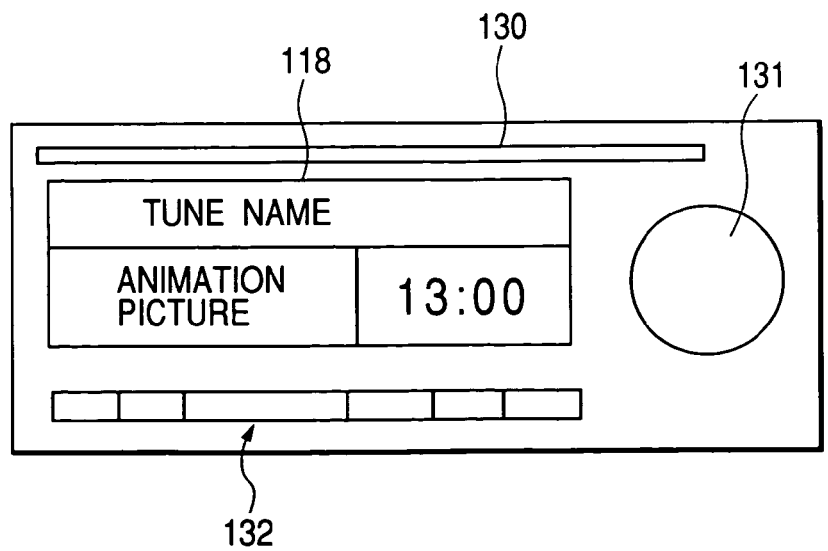
FIG. 22 is a plan view of the front face of a main unit in the on-vehicle apparatus of FIG. 21.

As shown in FIG. 22, the front face of the main unit in the on-vehicle apparatus has the display panel 118, an opening 130 via which a recording medium (for example, a CD-R) can be inserted into and ejected from the removable-disc drive 120 (see FIG. 21), a knob 131, and an array 132 of buttons. The knob 131 and the button array 132 are contained in the human interface 114 in FIG. 21.

A nonvolatile memory may be provided in the on-vehicle audio apparatus. In this case, the hard-disc drive 122 is used to copy contents data (audio data and picture data) onto the recording medium therein while the nonvolatile memory is designed to implement other tasks which are originally assigned to the combination of the hard-disc drive 122 and the recording medium therein. The hard-disc drive 122 may be omitted from the on-vehicle apparatus. In this case, during the playback mode of operation of the on-vehicle apparatus, audio information is reproduced from the recording medium within the removable-disc drive 120.

Data and information are transmitted among the devices 110, 112, 114, 116, 118, 120, 122, and 123 via the bus 124. The computer program in the recording medium within the hard-disc drive 122 includes a computer program for reproducing animation pictures (images). For example, the computer program for reproducing animation pictures is downloaded from a removable disc to the recording medium within the hard-disc drive 122 through the removable-disc drive 120 and the bus 124. Alternatively, the computer program for reproducing animation pictures may be downloaded from a communication network, the Internet, or a broadcasting station to the recording medium within the hard-disc drive 122 through the receiver unit 112 and the bus 124.

The on-vehicle audio apparatus operates in accordance with the computer program for reproducing animation pictures. The computer program is designed to implement operation steps mentioned hereafter.

There is a removable disc or a CD-R on which audio information and data representative of animation pictures are recorded. In the case where the CD-R is inserted into the on-vehicle audio apparatus and a tune represented by audio information in the CD-R is reproduced, data representing animation pictures related with the reproduced tune are read out from the CD-R and the animation pictures are indicated on the display panel 118 as simple moving pictures. Also in the case where an audio file is reproduced from a folder in the recording medium within the hard-disc drive 122 which contains an image file of animation pictures related with the reproduced audio file and inputted via the receiver unit 112, the image file is read out from the folder and the animation pictures are indicated on the display panel 118 as simple moving pictures. The pixel number and the gradation steps of the animation pictures are in harmony with the display panel 118. Therefore, the animation pictures are accepted by the display panel 118 as they are.

The name of the image file of the animation pictures in the CD-R has a prescribed extension for denoting that a related file is an animation-picture file. In FIG. 13, an audio file "abcdf.mp3" and an image file "aaa-xxxjmm" are placed in a common folder (a common file group) in the CD-R. In the case where the on-vehicle audio apparatus is commanded by the user to reproduce a requested audio file in the CD-R, the CPU 110 is controlled by the computer program to search a folder inclusive of the requested audio file for an image file having a name with the prescribed extension. When the target image file is found, the target image file is reproduced from the CD-R and the animation pictures therein are indicated on the display panel 118. At this time, the CPU 110 may operate to implement the playback of the requested audio file. In the case where the folder contains a plurality of audio files as shown in FIG. 14, the animation pictures in the image file are indicated on the display panel 118 during the playback of each of the audio files.

As the requested tune (that is, the requested audio file) is played back, animation pictures are sequentially indicated in an order as a start picture→an intermediate picture or pictures→an end picture or an order as the start picture→the intermediate picture or pictures→the end picture→the intermediate picture or pictures→the start picture. Preferably, in the given relation-providing way regarding FIG. 16, information indicative of the indication order is written in the picture access file "musicxyz.jlk". In the given relation-providing way regarding FIG. 15, information indicative of the indication order is written in the header information. After the indication reaches the final picture, the final picture continues to be indicated as a still picture. The sequential indication of the animation pictures may be iterated during the playback of the requested tune.

In the case where an audio file, a picture access file "musicxyz.jlk", and an image-file folder are stored in a manner as shown in FIG. 16, the CPU 110 is controlled by the computer program to detect the relation between the audio file and the image files in the image-file folder by referring to the picture access file "musicxyz.jlk". Then, the CPU 110 identifies target image files in the image-file folder according to the detected relation. The CPU 110 enables the target image files to be reproduced, and controls the display panel 118 to indicate the pictures represented by the target image files.

In the case where audio files, image files, and a relation indicator file "audioanim.jlx" are stored in a manner as shown in FIG. 18, the CPU 110 is controlled by the computer program to detect the relation between the audio files and the image files by referring to the relation indicator file "audioanim.jlx". Then, the CPU 110 identifies target one among the image files according to the detected relation. The target image file is previously related with a requested tune. The CPU 110 enables the target image file to be reproduced, and controls the display panel 118 to indicate animation pictures represented by the target image file.

In the case where an audio file and an image file are stored in a manner as shown in FIG. 17, the CPU 110 is controlled by the computer program to search for an image file which has a name substantially equal to that of a requested audio file, and which has an extension denoting that a related image file is an animation-picture file. The CPU 110 enables a target image file found as a result of the search to be reproduced, and controls the display panel 118 to indicate animation pictures represented by the target image file.

In the case where a file of an animation picture or pictures for a disc title representative of the CD-R is decided by the name of the file so that the animation-picture file can be identified by the on-vehicle audio apparatus, the CPU 110 is controlled by the computer program to search for the file name immediately after the CD-R is inserted into the on-vehicle audio apparatus. The CPU 110 enables a target image file found as a result of the search to be reproduced, and controls the display panel 118 to indicate an animation picture or pictures represented by the target image file.

In the case where a requested tune with which no animation picture is related is reproduced from the CD-R, the CPU 110 is controlled by the computer program to indicate an animation picture representative of the CD-R on the display panel 118.

Information may be copied from the CD-R onto the recording medium within the hard-disc drive 122 via the removable-disc drive 120 and the bus 124. Preferably, the recording medium within the hard-disc drive 122 is provided with folders containing the information copied from the CD-R. When each of the folders is selected and reproduced, the CPU 110 is controlled by the computer program to indicate animation pictures on the display panel 118 similarly to the case of the insertion of the CD-R into the on-vehicle audio apparatus.

In the case where the recording medium within the hard-disc drive 122 is provided with folders containing the information copied from the CD-R, the on-vehicle audio apparatus can be commanded by the user to search for a desired folder or a desired tune. It is possible to reproduce the desired tune or the music represented by the desired folder. The search may be designed so that information about a candidate folder or a candidate tune will be indicated on the display panel 118. Preferably, the CPU 110 is controlled by the computer program to indicate animation pictures, which are related with the candidate folder or the candidate tune, on the display panel 118. The indicated animation pictures can remind the user of the contents of the candidate folder or the candidate tune. Thus, it is easy for the user to select a folder or a tune.

Generated animation pictures may include starting animation pictures which can be set by the user. When the on-vehicle audio apparatus is turned on, the CPU 110 is controlled by the computer program to indicate the starting animation pictures on the display panel 118. Specifically, a particular file name or a particular extension may be prescribed as an indication of animation pictures to be installed on the on-vehicle audio apparatus. After the CD-R is inserted into the on-vehicle audio apparatus, the user operates the on-vehicle audio apparatus to start installing animation pictures thereon. The CPU 110 is controlled by the computer program to search for animation pictures having the particular file name or the particular extension. When the animation pictures having the particular file name or the particular extension are found, the CPU 110 operates to indicate the animation pictures on the display panel 118. At the same time, an OK button and a cancel button are indicated on the display panel 118. When the OK button is clicked by the user, the CPU 110 is controlled by the computer program to save data representative of the indicated animation pictures in the recording medium within the hard-disc drive 122. The data representative of the indicated animation pictures may be saved in a nonvolatile memory. When the cancel button is clicked by the user, the CPU 110 is controlled by the computer program to inhibit the data representative of the indicated animation pictures from being saved in the recording medium within the hard-disc drive 122. Thus, in this case, installing animation pictures on the on-vehicle audio apparatus is not performed.

In the case where the on-vehicle audio apparatus is commanded by the user to start installing animation pictures thereon, the CPU 110 may be controlled by the computer program to search the CD-R for files having extensions denoting that the related files are animation-picture files for the on-vehicle audio apparatus. Then, the CPU 110 may control the display panel 118 to sequentially indicate the found files. At the same time, an OK button is indicated on the display panel 118. When currently-indicated animation pictures are desired, the user clicks the OK button so that the CPU 110 saves data representative of the desired animation pictures in the recording medium within the hard-disc drive 122.

FIG. 23 is a flowchart of an example of a segment of the computer program for reproducing animation pictures. The program segment in FIG. 23 is repetitively executed. As shown in FIG. 23, a first step S300 of the program segment decides whether or not an audio file is selected by the user as an object to be reproduced. When an audio file is selected, the program advances from the step S300 to a step S302. Otherwise, the program exits from the step S300, and then the current execution cycle of the program segment ends.

The step S302 searches a folder (a file group), in which the selected audio file is included, for an image file related with the selected audio file.

A step S304 following the step S302 accesses the image file found as a result of the search by the step S302. The step S304 reproduces the accessed image file. Thus, animation pictures in the accessed image file are indicated on the display panel 118. After the step S304, the current execution cycle of the program segment ends.

The on-vehicle audio apparatus may be replaced by a home-use audio apparatus or a portable audio apparatus.

Data representative of generated animation pictures may be inputted into the on-vehicle audio apparatus from a semiconductor-based memory device (for example, a memory card) rather than a CD-R. Information including data representative of generated animation pictures may be transmitted from the personal computer to the on-vehicle audio apparatus via a radio communication system or a wireless communication system rather than a CD-R.

Advantages Provided by the Invention

A user can freely make animation pictures to be indicated on the display panel of an on-vehicle audio apparatus. For every tune or every album, animation pictures suiting user's taste can be indicated on the display panel of the on-vehicle audio apparatus.

During a search, information about a candidate folder or a candidate tune is indicated on the display panel of the on-vehicle audio apparatus. At this time, animation pictures which are related with the candidate folder or the candidate tune are indicated on the display panel. The indicated animation pictures can remind the user of the contents of the candidate folder or the candidate tune. Thus, it is easy for the user to select a folder or a tune.

Furthermore, it is easy to implement the setting about relating tunes (or albums) and animation pictures with each other. In addition, it is easy to operate the on-vehicle audio apparatus.

What is claimed is:

1. A computer readable medium storing a computer program used with a picture generation system for generating animation pictures the computer-readable medium, comprising the steps of:
designating a first area in a source picture;
designating a second area in the source picture;
generating a start picture from a portion of the source picture which extends in the first area;
generating an end picture from a portion of the source picture which extends in the second area;
designating at least one third area in the source picture, the third area extending between the first and second areas;
generating an intermediate picture from a portion of the source picture which extends in the third area;
generating an image file of a prescribed format which contains data representative of animation pictures including the start picture, the intermediate picture, and the end picture;
relating the image file with an audio file containing data representative of audio information;
generating a file group including the image file and the audio file; and
recording the file group on the recording medium.

2. A computer readable medium storing a computer program used with a picture generation system for generating animation pictures the computer-readable medium, comprising the steps of:
designating a first area in a source picture;
designating a second area in the source picture;
generating a start picture from a portion of the source picture which extends in the first area;
generating an end picture from a portion of the source picture which extends in the second area;
combining a portion of the start picture and a portion of the end picture into an intermediate picture;
generating an image file of a prescribed format which contains data representative of animation pictures including the start picture, the intermediate picture, and the end picture;
relating the image file with an audio file containing data representative of audio information;
generating a file group including the image file and the audio file; and
recording the file group on the recording medium.

3. A computer readable medium storing a computer program used with a picture generation system for generating animation pictures for transmission to an external device, comprising the steps of:
designating a first area in a source picture;
designating a second area in the source picture;
generating a start picture from a portion of the source picture which extends in the first area;
generating an end picture from a portion of the source picture which extends in the second area;
designating at least one third area in the source picture, the third area extending between the first and second areas;
generating an intermediate picture from a portion of the source picture which extends in the third area;
generating an image file of a prescribed format which contains data representative of animation pictures including the start picture, the intermediate picture, and the end picture;
relating the image file with an audio file containing data representative of audio information;
generating a file group including the image file and the audio file; and
transmitting the file group toward the external device.

4. A computer readable medium storing a computer program used with a picture generation system for generating animation pictures for transmission to an external device, comprising the steps of:
designating a first area in a source picture;
designating a second area in the source picture;
generating a start picture from a portion of the source picture which extends in the first area;
generating an end picture from a portion of the source picture which extends in the second area;
combining a portion of the start picture and a portion of the end picture into an intermediate picture;

generating an image file of a prescribed format which contains data representative of animation pictures including the start picture, the intermediate picture, and the end picture;

relating the image file with an audio file containing data representative of audio information;

generating a file group including the image file and the audio file; and transmitting the file group toward the external device.

5. A method of generating animation pictures, comprising the steps of:

designating a first area in a source picture;

designating a second area in the source picture;

cutting a portion, which extends in the first area, from the source picture to generate a start picture;

cutting a portion, which extends in the second area, from the source picture to generate an end picture;

designating at least one third area in the source picture, the third area extending between the first and second areas;

cutting a portion, which extends in the third area, from the source picture to generate an intermediate picture;

generating an image file which contains data representative of animation pictures including the start picture, the intermediate picture, and the end picture;

relating the image file with an audio file containing data representative of audio information; and generating a file group including the image file and the audio file.

6. A method as recited in claim 5, further comprising the step of recording the file group on a removable recording medium.

7. An apparatus for generating animation pictures, comprising:

first means for designating a first area in a source picture;

second means for designating a second area in the source picture;

third means for cutting a portion, which extends in the first area designated by the first means, from the source picture to generate a start picture;

fourth means for cutting a portion, which extends in the second area designated by the second means, from the source picture to generate an end picture;

fifth means for designating at least one third area in the source picture, the third area extending between the first and second areas;

sixth means for cutting a portion, which extends in the third area designated by the fifth means, from the source picture to generate an intermediate picture;

seventh means for generating an image file which contains data representative of animation pictures including the start picture, the intermediate picture, and the end picture;

eighth means for relating the image file generated by the seventh means with an audio file containing data representative of audio information; and ninth means for generating a file group including the image file and the audio file.

8. An apparatus as recited in claim 7, further comprising tenth means for recording the file group generated by the ninth means on a removable recording medium.

* * * * *